US011972290B2

(12) United States Patent
Ruedinger

(10) Patent No.: US 11,972,290 B2
(45) Date of Patent: Apr. 30, 2024

(54) TIME MANAGEMENT FOR ENHANCED QUANTUM CIRCUIT OPERATION EMPLOYING A HYBRID CLASSICAL/QUANTUM SYSTEM

(71) Applicant: International Business Machines Corporation, Armonk, NY (US)

(72) Inventor: Jeffrey Joseph Ruedinger, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 17/400,659

(22) Filed: Aug. 12, 2021

(65) Prior Publication Data
US 2023/0050809 A1 Feb. 16, 2023

(51) Int. Cl.
G06F 9/46 (2006.01)
G06F 9/48 (2006.01)
G06N 10/00 (2022.01)

(52) U.S. Cl.
CPC ............ *G06F 9/4887* (2013.01); *G06F 9/485* (2013.01); *G06N 10/00* (2019.01)

(58) Field of Classification Search
CPC ........ G06F 9/4887; G06F 9/485; G06N 10/00
See application file for complete search history.

(56) References Cited

U.S. PATENT DOCUMENTS 10,452,989 B2    10/2019  Majumdar
2016/0328253 A1  11/2016  Majumdar
2023/0012797 A1*  1/2023  Kong ................... G06F 9/4887

OTHER PUBLICATIONS

Mell et al., "The NIST Definition of Cloud Computing," Recommendations of the National Institute of Standards and Technology, NIST Special Publication 800-145, Sep. 2011, 7 pages.
Guerreschi, "Fast simulation of quantum algorithms using circuit optimization," arXiv:2010.09746v2 [quant-ph] Dec. 30, 2020, 7 pages.
De Raedt et al., "Quantum Computer Emulator," arXiv:quant-ph/9911041v2 Mar. 29, 2000, 29 pages.

* cited by examiner

*Primary Examiner* — Gregory A Kessler
(74) *Attorney, Agent, or Firm* — Amin, Turocy & Watson, LLP

(57) ABSTRACT

Systems, computer-implemented methods and/or computer program products are provided for facilitating time management of a quantum program at one or more nodes of a system, such as a hybrid classical/quantum system. A system, such as a classic portion of the hybrid system, can comprise a memory that stores computer executable components and a processor that executes the computer executable components stored in the memory. The computer executable components can comprise a time management component that can communicate with a node to trigger the node to execute one or more quantum program instructions relative to a counter of the node that is advanced by the communicating. The time management component can advance the counter at the node based upon a combination of time of another node and of a determined actual propagation time for the communicating.

20 Claims, 11 Drawing Sheets

US 11,972,290 B2

TIME MANAGEMENT FOR ENHANCED QUANTUM CIRCUIT OPERATION EMPLOYING A HYBRID CLASSICAL/QUANTUM SYSTEM

BACKGROUND

One or more embodiments described herein relate generally to quantum program control, and more specifically, to time management for enhanced quantum circuit operation employing a hybrid classical/quantum system.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, systems, computer-implemented methods, apparatuses and/or computer program products are described that can facilitate time management of a quantum program at one or more nodes of a system.

According to an embodiment, a system can comprise a memory that stores computer executable components and a processor that executes the computer executable components stored in the memory. The computer executable components can comprise a time management component that communicates with a node to trigger the node to execute one or more quantum program instructions relative to a counter of the node that is advanced by the communicating.

According to another embodiment, a computer-implemented method can comprise communicating, by a system operatively coupled to a processor, with a node to trigger the node to execute one or more quantum program instructions relative to a counter of the node that is advanced by the communicating.

According to still another embodiment, a computer program product for facilitating time management of a quantum program at one or more nodes of a system can comprise a computer readable storage medium having program instructions embodied therewith. The program instructions can be executable by a processor to communicate, by the processor, with a node to trigger the node to execute one or more quantum program instructions relative to a counter of the node that is advanced by the communicating.

DETAILED DESCRIPTION

Figure 1:
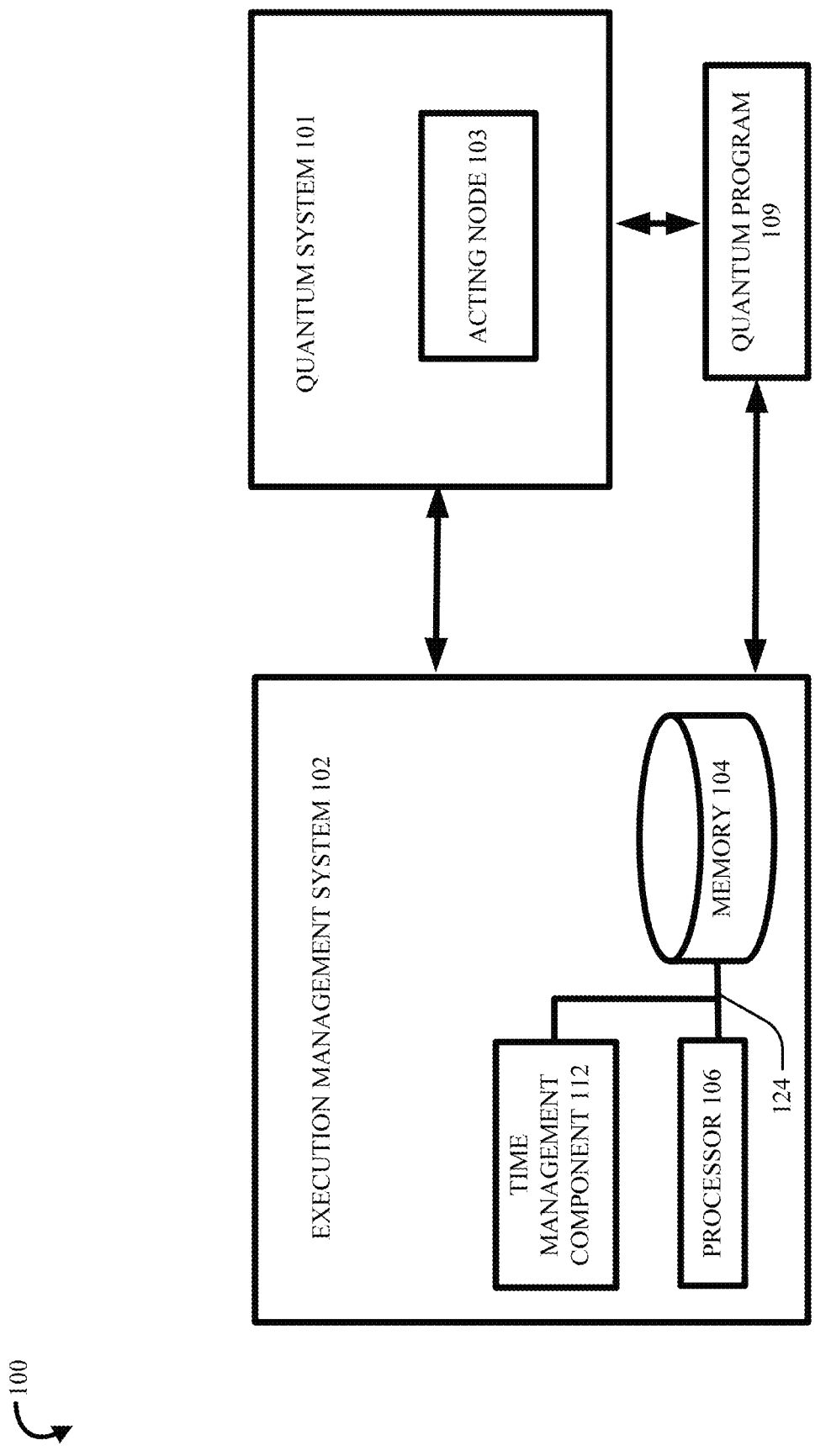
FIG. 1 illustrates a block diagram of an example, non-limiting system that can facilitate time management of a quantum program at one or more nodes of a system, in accordance with one or more embodiments described herein.

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

Quantum computing generally involves the use of quantum-mechanical phenomena to perform computing and information processing functions. Quantum computing can employ quantum physics to encode and process information rather than binary digital techniques based on transistors. That is, while classical computers can operate on bit values that are either 0 or 1, a quantum computing device can employ quantum bits (also referred to as qubits) that can operate according to the laws of quantum physics and can exhibit phenomena such as superposition and/or entanglement.

The superposition principle of quantum physics can allow a qubit to be in a state that partially represents both a value of "1" and a value of "0" at the same time. The entanglement principle of quantum physics can allow qubits to be correlated. For instance, a state of a first qubit can depend on a state of a second qubit, and/or vice versa. As such, a quantum circuit can employ qubits to encode and process information in a manner that can be quite different from binary digital techniques based on transistors. Indeed, quantum computing has the potential to solve problems that, due to computational complexity, cannot be solved or can only be solved comparatively more slowly on a classical computer.

Quantum computing can utilize specialized controls, such as quantum circuits, to operate on qubits. Quantum circuits are transformations that can perform operations on qubits. Quantum circuits, for instance as part of a quantum program, can be implemented as one or more quantum gates, such as a sequence of quantum gates. The quantum gates can be implemented as one or more physical operations on a set of qubits, such as implementing a sequence of pulses. A pulse is a time-dependent tone (e.g., wave or waveform) that can be applied to a qubit to change a state of the qubit and/or to analyze a state of the qubit.

Quantum programming can involve the process of assembling sequences of instructions, which can be called quantum programs, that can be capable of running on a quantum computer. A quantum program can be associated with a collection of quantum circuits. When a quantum program is executed, one or more measurements can be computed, such as by the quantum system and/or an associated classical system. The one or more measurements can include one or more resonant and/or oscillating frequencies of one or more qubits of the quantum system, which one or more resonant and/or oscillating frequencies can represent one or more states and/or oscillations of the one or more qubits.

Control of quantum programs can employ both classical resources and quantum resources, and thus can employ one or more hybrid classical/quantum systems. Classical resources (e.g., one or more controlling nodes, such as one or more controlling CPUs) can be employed to exercise control over one or more acting nodes. One or more acting nodes, such as one or more quantum processors, can perform qubit operations, such as qubit measurements and/or can operate one or more quantum circuits by implementing one or more quantum pulses.

In one or more embodiments software simulation or hardware simulation can be employed to advance a quantum program by executing instructions for facilitating one or more quantum tasks on and/or relative to one or more qubits. With respect to software simulation, an instruction set simulator can advance a quantum program by executing one or more instructions. An instruction set simulator does not model underlying clock cycles per instruction. Rather, one or more instructions executed can instead align different streams of quantum tasks and/or pause execution of quantum tasks until data is available to proceed. Instructions streams on different nodes can execute independently, such as operating as separate threads. Objects that rely on clock cycles, such as time of day (TOD) counters or timers, are not modelled and/or are abstracted by the instruction set simulator because a number of clock cycles can be difficult to precisely maintain or cannot be precisely maintained. This type of simulation can be deficient when used for execution of a quantum program, in that operation and/or alignment of quantum tasks can utilize accurate precision of clock cycles, yet such accurate precision can be difficult to maintain and/or be not maintainable by the software simulation.

Alternatively, a hardware simulation can be employed to advance a quantum program by executing one or more cycles of a common clock relative to one or more nodes executing one or more instructions. The number of clock cycles can be precisely maintained by the common clock to enable accurate modelling, such as via TOD counts. At each clock cycle, all nodes are generally invoked to process input, if such input is pending. This type of simulation can facilitate operation and/or alignment of quantum tasks with such accurate precision of clock cycles. Nonetheless, this accurate modelling can entail a loss of performance, such as due to lower speed and/or increased processing power for the invocation at each node at each clock cycle.

Further complicating quantum program execution on a large scale, a large quantity of quantum jobs can create pressure to execute the respective quantum programs quickly. That is, increased speed of execution can directly and/or indirectly correlate to maximizing system usage, minimizing compiling time to compile quantum programs, minimizing users having to wait for the compiling to be completed, and/or minimizing undesirable consuming of classical computational resources. Pressure also can be created to execute these quantum jobs well, so that a high performance can be extracted from near-term error-prone systems and/or so that a quality of compiling into physical-level pulses can be improved (e.g., related to accuracy, precision and/or efficiency of pulse execution).

Turning now to one or more embodiments described herein, such one or more embodiments can provide one or more systems, methods and/or computer program products to improve (e.g., enhance, optimize and/or reduce) the execution of quantum jobs by accounting for one or more deficiencies of existing instruction set simulation and/or hardware simulation techniques. Generally, the one or more systems, methods and/or computer program products can employ an emulator or simulator, such as an instruction set emulator, to execute one or more instructions for operating one or more quantum programs of one or more quantum jobs. Generally, the one or more systems, methods and/or computer program products can improve execution time and or instruction execution accuracy for executing quantum jobs and/or can improve the quality of execution of such quantum jobs, as compared to existing techniques. In one or more embodiments described herein, the one or more systems, methods and/or computer program products can advance a quantum program by executing one or more streams of one or more instructions on one or more different nodes, which streams and/or nodes can be operated as separate threads. The one or more systems, methods and/or computer program products can also provide accurate modelling of counters and/or timers, such as TOD counters, for enabling accurate execution and/or alignment of one or more quantum tasks. These techniques can enable performance improvements over existing instruction set simulation and/ or hardware simulation techniques, such as when simulating a quantum program running on a model of a quantum control system containing a mix of classical and quantum components.

For example, the one or more embodiments described herein can enable improved performance by a combination of global and local counter management of counters, e.g., local counters, at the one or more acting nodes of a system. Performance at the one or more acting nodes can be dedicated to executing instructions to advance a respective quantum program. Further, execution instructions for being executed at the one or more acting nodes can be modeled by a scheduler absent modeling of instructions and/or portions thereof to align execution at one or more acting nodes and/or to address one or more dependencies among the one or more acting and/or control nodes. Instead, one or more embodiments described herein can manage triggering of one or more acting nodes to enable such alignment and/or to initiate instruction execution upon dependency fulfillment. This global management of alignment and/or initiation upon dependency fulfillment likewise can enable performance at the one or more acting nodes instead to be dedicated to executing instructions to advance a respective quantum program. As a result, precise timing can be employed for instruction execution without complex instruction scheduling and/or without high granularity invocation of input processing (e.g., at every clock cycle at all nodes).

Furthermore, classical resources (e.g., the one or more control nodes) can be non-deterministic and can take variable amounts of time to analyze data, prepare instructions and/or send instructions. Due to the variable amounts of time, synchronization among the controlling nodes and/or the acting nodes can be lost. That is, as a further result, synchronization loss can be prevented from, or at least enable a reduction in, disruption of, prolonged initialization of and/or failure of implementation of multi-qubit actions relying on synchronization. Additionally and/or alternatively, negative effects of synchronization loss on quantum program execution speed, quantum program execution quality and/or introduction of quantum error and/or noise also can be desirably reduced and/or prevented. As indicated, one or more embodiments described herein can manage triggering of one or more acting nodes to enable such resynchronization and/or alignment.

In one or more cases, one or more embodiments described herein can allow for increased scaling of execution of one or more quantum programs in view of increased execution time and/or execution quality. Additionally and/or alternatively, employing the described subject matter can allow for reduced cost and/or complexity of a system employed to execute a quantum program according to the described subject matter. This allowance can be due at least to the employment of low amounts of memory, time and/or computing power at the one or more acting nodes of a system in view of time management of the one or more acting nodes.

The one or more functions and/or processes generally described above will now be described below in further detail, with reference to the figures, where like referenced numerals are used to refer to like elements throughout description of one or more embodiments. As used herein, the term "entity" can refer to a machine, device, smart device, component, hardware, software and/or human. In the following description, for purposes of explanation, numerous specific details are set forth in order to provide a more thorough understanding of the one or more embodiments. It is evident in one or more cases, however, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100 and/or 200 as illustrated at FIGS. 1 and/or 2, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, one or more embodiments described herein can include one or more systems, computer-implemented methods, apparatuses and/or computer program products that can facilitate time management of a quantum program at one or more nodes of a system executing the quantum program. For example, FIG. 1 illustrates a block diagram of an example, non-limiting system 100 that can facilitate time management of an acting node 103 via the non-limiting system 100, such as via the execution management system 102.

As illustrated, the non-limiting system 100 can comprise a quantum system 101 and a classical system, such as an execution management system 102. That is, in one or more embodiments, the non-limiting system 100 can be a hybrid system. In one or more other embodiments, the quantum system 101 can be separate from, but function in combination with, the non-limiting system 100.

The illustrated quantum system 101 (e.g., quantum computer system, superconducting quantum computer system and/or the like) can be associated with, for example, accessible via, a cloud computing system. The quantum system 101 can employ quantum algorithms and/or quantum circuitry, including computing components and/or devices, to perform quantum operations and/or functions on input data to produce results that can be output to an entity relative to a quantum program 109. One or more components can be comprised by the quantum system 101, the output of which can comprise qubit measurement data. Although not shown, the quantum system 101 can include a respective memory and/or quantum processor.

As shown, the quantum system 101 can include an acting node 103 for controlling one or more qubits of the quantum system 101 to thereby execute the quantum program 109. As used herein, a node (e.g., control or acting node) can include one or more machines. The one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

In the illustrated embodiment, the non-limiting system 100 includes the quantum system 101. Alternatively, the quantum system 101 can be external to, but accessible by, the non-limiting system 100. Alternatively, the execution management system 102 can include one or more components that can perform one or more processes performed by the quantum system 101.

The non-limiting system 100 can comprise the execution management system 102, which can be associated with, such as accessible via, a cloud computing environment. The execution management system 102 can comprise one or more components, such as a memory 104, processor 106, bus 124 and/or time management component 112. Generally, execution management system 102, and thus non-limiting system 100, can facilitate execution of a quantum program 109 via communication with and time management of the acting node 103.

The execution management system 102 can provide one or more processes and/or functions to serve as an instruction set emulator. For example, the time management component 112 can communicate with a node, such as the acting node 103, to trigger the node to execute one or more quantum program instructions relative to a counter of the node that is advanced by the communicating. Put another way, the time management component can advance the counter at the node when triggering the node, and/or separate from triggering the node, to execute the one or more quantum program instructions. One or more communications can be employed by the time management component 112 to achieve one or both of the triggering and/or counter advancement. The communication can be facilitated via any suitable wired and/or wireless method including any suitable hardware and/or software. In one example, the time management component 212 can transfer data to control triggering of the acting node 103 for executing one or more quantum program instructions at the node. Via the data transfer, the time management component 212 can cause a jump in the counter of the acting node 103.

Accordingly, the one or more processes to be performed by the execution management system 102 can enable improved performance by globally managing transfer of data to the acting node 103 to trigger initiation of one or more of the acting node 103, such as upon a dependency being fulfilled and/or for initiation of one or more quantum program instruction executions. This global management of alignment and/or initiation, such as upon a dependency fulfillment, can enable performance at the one or more acting nodes instead to be dedicated to executing instructions to advance a respective quantum program. Further, instructions can be modeled by a scheduler of the non-limiting system 100 without additional modeling of instructions and/or portions thereof that align execution at the one or more acting nodes and/or that address one or more dependencies among the one or more acting nodes.

It also will be appreciated that operation of the execution management system 102 is not limited to control of a single acting node 103 at a time. Rather, use of the execution management system 102 itself can be scalable, such as where the execution management system 102 can control an acting node at least partially in parallel at a same time with another acting node.

Figure 2:
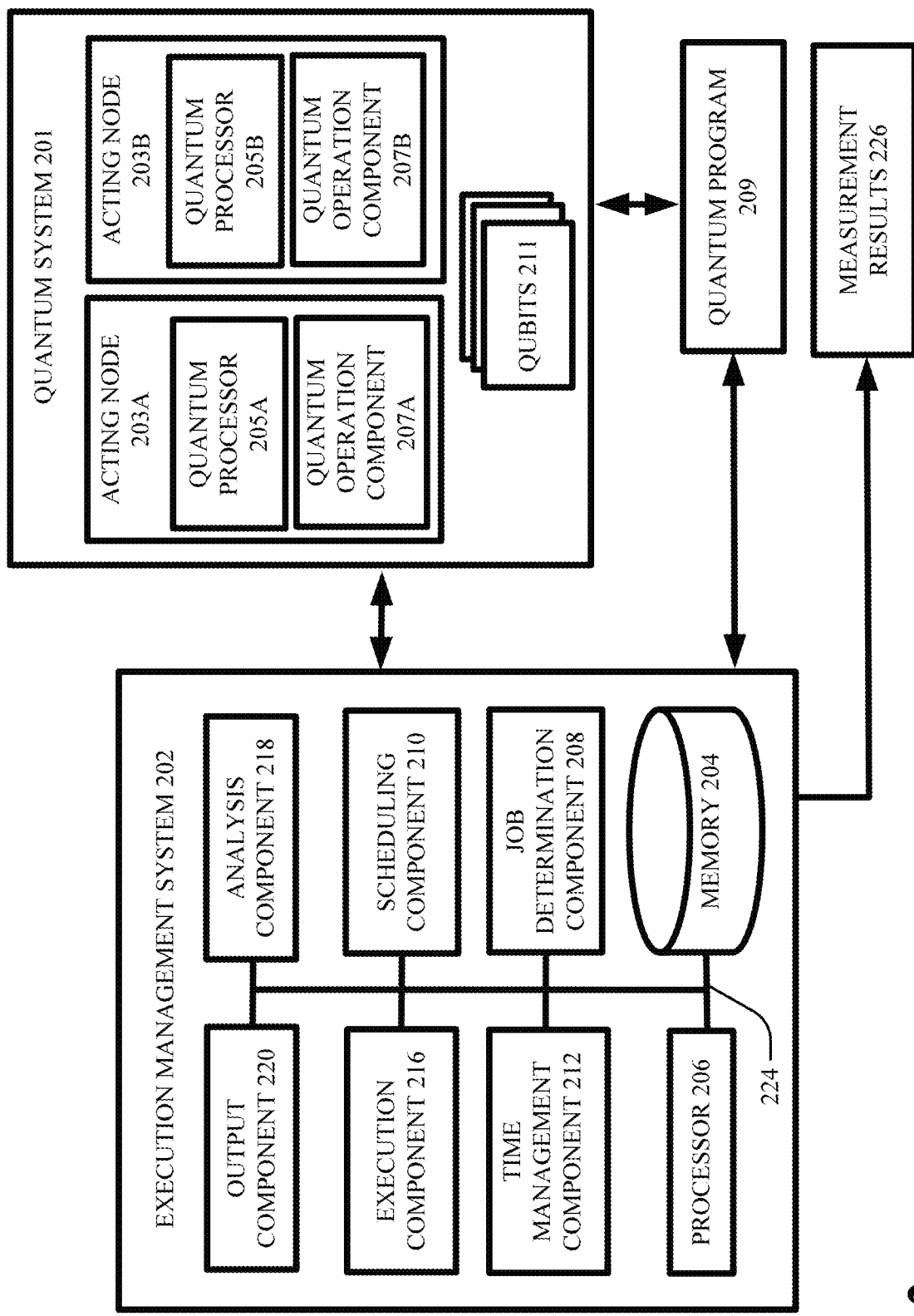
FIG. 2 illustrates another block diagram of an example, non-limiting system that can facilitate time management of a quantum program at one or more nodes of a system, in accordance with one or more embodiments described herein.

Turning next to FIG. 2, the figure illustrates a block diagram of an example, non-limiting system 200 that can facilitate time management of a quantum program at one or more nodes of a system executing the quantum program. It will be appreciated that descriptions regarding the non-limiting system 200 and/or one or more components thereof can apply to the non-limiting system 100 and/or to one or more components thereof and/or vice versa.

As used herein, a node (e.g., control or acting node) can include one or more machines. The one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

Turning now to one or more details of the non-limiting system 200, as illustrated, the non-limiting system 200 can comprise a quantum system 201 and a classical system, such as an execution management system 202. In one or more embodiments, the non-limiting system 200 can be a hybrid system. In such example, the quantum system 201 can be separate from, but function in combination with, the non-limiting system 200.

The illustrated quantum system 201 (e.g., quantum computer system, superconducting quantum computer system and/or the like) can employ quantum algorithms and/or quantum circuitry, including computing components and/or devices, to perform quantum operations and/or functions on input data to produce results that can be output to an entity.

The quantum circuitry can comprise circuitry for quantum bits (qubits), such as multi-bit qubits, physical circuit level components, high level components and/or functions. The quantum circuitry can involve physical pulses that can be structured (e.g., arranged and/or designed) to perform desired quantum functions and/or computations on data (e.g., input data and/or intermediate data derived from input data) to produce one or more quantum results and/or measurements as an output. The quantum results and/or measurements can be responsive to the quantum job request and associated input data and can be based at least in part on the input data, quantum functions and/or quantum computations.

The quantum system 201 can include one or more acting nodes, such as acting nodes 203A and 203B for controlling one or more qubits 211 for executing the quantum program 209. Acting nodes can be quantum resources that can perform one or more quantum tasks such as pulse generation, waveform generation, quantum measurement and/or other function related and/or involving one or more qubits. These acting nodes can be locally and/or non-centrally distributed relative to one another, and/or any suitable number of acting nodes can be communicatively connected with one another via any suitable method. It will be appreciated that one or more acting nodes can be quantum resources and/or can include one or more quantum components in one or more other embodiments. Additionally and/or alternatively, it will be appreciated that one or more acting nodes can provide one or more of the below-listed functions of a control node and/or one or more control nodes can provide one or more of the above-listed functions of an acting node.

In one or more embodiments, the quantum system 201 can comprise one or more quantum components, such as a quantum operation component and/or a quantum processor. For example, the acting node 203A can include a quantum operation component 207A and/or a quantum processor 205A, and the acting node 203B can include a quantum operation component 207B and/or a quantum processor 205B. In one or more embodiments, the quantum system 201 can include a quantum operation component and/or a quantum processor separate from one or more acting nodes thereof.

A quantum operation component can perform one or more quantum processes, calculations and/or measurements for operating one or more quantum circuits on one or more qubits 211. For example, the quantum operation component 207A and/or 207B can operate one or more qubit effectors, such as qubit oscillators, harmonic oscillators, pulse generators and/or the like to cause one or more pulses and/or signals to stimulate and/or manipulate the state(s) of the one or more qubits 211 existing at the quantum system 201. Additionally and/or alternatively, the quantum operation component 207A and/or 207B can perform one or more quantum measurements.

A quantum processor can be a suitable processor, such as being capable of controlling qubit generation and the like. A quantum processor can generate one or more instructions for controlling the one or more processes of one or more quantum operation components (e.g., quantum operation component 207A and/or 207B).

Turning now to the classical portion of the non-limiting system 200, the execution management system 202 can be included in a classical system of a control node, although not shown. Alternatively, the execution management system 202 can itself be a control node. Control nodes can be classical resources that can provide scheduling, instructions, data analysis, measurement analysis, quantum parameter optimization and/or the like. Control nodes can be locally and/or non-centrally distributed relative to one another, and/or any two or more control nodes can be communicatively connected with one another via any suitable method. It will be appreciated that one or more control nodes can be quantum resources and/or can include one or more quantum components in one or more other embodiments.

Additionally and/or alternatively, one or more other node types beyond acting nodes and control nodes can be possible. For example, a pass-through node can be employed to aid in physical distribution and/or connectivity, an interface node can be employed between quantum systems and/or a qubit group controller can be employed to manage a collection of imperfect qubits, for instance as a single error-protected qubit.

Further, as will be appreciated below, one or more processes performed by the execution management system 202 are described below relative only to the one or more acting nodes 203A and 203B of the quantum system 201, such as for ease of explanation. However, the one or more process performed by the execution management system 202, such as by the scheduling component 210, time management component 212 and/or execution component 216, are applicable to and/or can be performed with respect to one or more additional and/or other acting nodes, one or more control nodes, and/or one or more other node types as described above. That is, the execution management system 202 can function to control time management at various and/or all nodes of a hybrid classical/quantum system, such as for execution of a quantum program.

The execution management system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, execution management system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

In one or more embodiments, execution management system 202 can comprise a processor 206 (e.g., computer processing unit, microprocessor, classical processor, quantum processor and/or like processor). In one or more embodiments, a component associated with execution management system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise a job determination component 208, scheduling component 210, time management component 212, execution component 216, analysis component 218 and/or output component 220.

In one or more embodiments, the execution management system 202 can comprise a computer-readable memory 204 that can be operably connected to the processor 206. The memory 204 can store computer-executable instructions that, upon execution by the processor 206, can cause the processor 206 and/or other components of the execution management system 202 (e.g., job determination component 208, scheduling component 210, time management component 212, execution component 216, analysis component 218 and/or output component 220) to perform one or more actions. In one or more embodiments, the memory 204 can store computer-executable components (e.g., job determination component 208, scheduling component 210, time management component 212, execution component 216, analysis component 218 and/or output component 220).

Execution management system 202 and/or a component thereof as described herein, can be communicatively, electrically, operatively, optically and/or otherwise coupled to one another via a bus 224 to perform functions of non-limiting system 200, execution management system 202 and/or one or more components thereof and/or coupled therewith. Bus 224 can comprise one or more of a memory bus, memory controller, peripheral bus, external bus, local bus, quantum bus and/or another type of bus that can employ one or more bus architectures. One or more of these examples of bus 224 can be employed to implement one or more embodiments described herein.

In one or more embodiments, execution management system 202 can be coupled (e.g., communicatively, electrically, operatively, optically and/or like function) to one or more external systems, sources and/or devices (e.g., classical and/or quantum computing devices, communication devices and/or like devices), such as via a network. In one or more embodiments, one or more of the components of the non-limiting system 200 can reside in the cloud, and/or can reside locally in a local computing environment (e.g., at a desired location(s)).

In addition to the processor 206 and/or memory 204 described above, execution management system 202 can comprise one or more computer and/or machine readable, writable and/or executable components and/or instructions that, when executed by processor 206, can facilitate performance of one or more operations defined by such component(s) and/or instruction(s). Further, in one or more embodiments, execution management system 202 can comprise the job determination component 208, scheduling component 210, time management component 212, execution component 216, analysis component 218 and/or output component 220.

Figure 9:
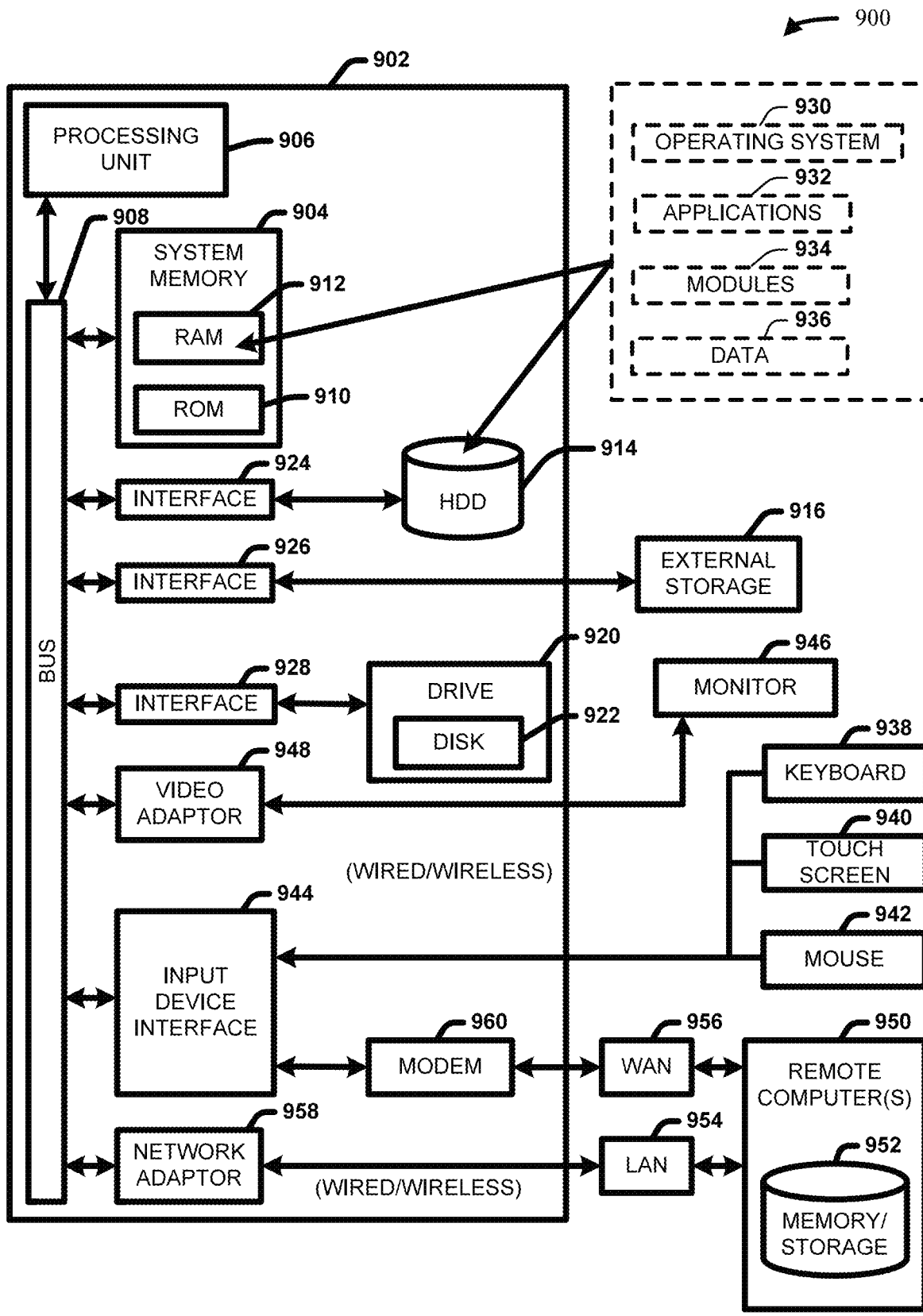
FIG. 9 illustrates a block diagram of an example, non-limiting operating environment in which one or more embodiments described herein can be facilitated.
Figure 10:
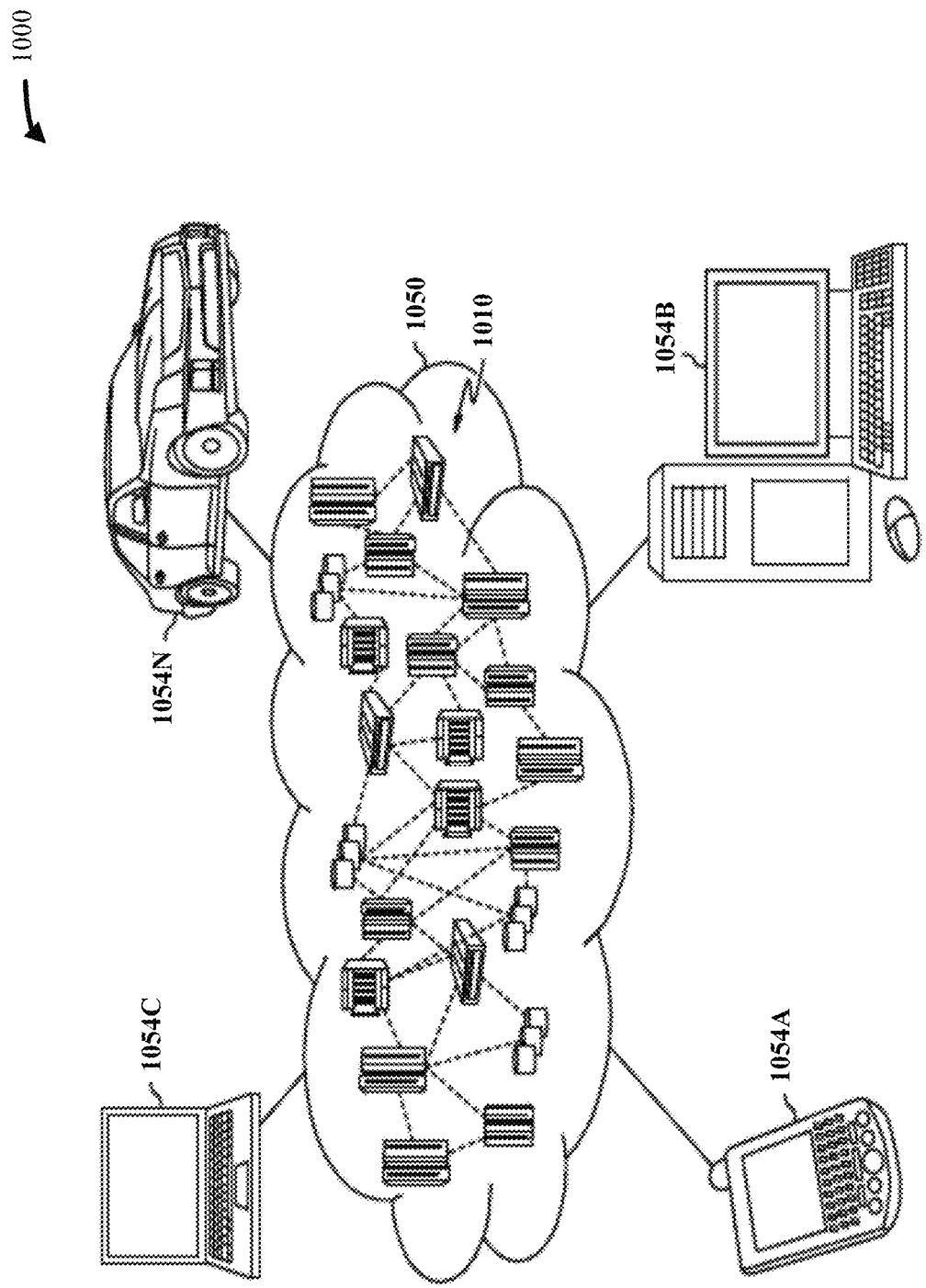
FIG. 10 illustrates a block diagram of an example, non-limiting cloud computing environment in accordance with one or more embodiments described herein.

The job determination component 208 can employ one or more aspects of an operating environment, such as the operating environment 900 illustrated at FIG. 9, to provide, such as to receive, retrieve and/or otherwise obtain, a job request, such as a quantum job request, such as from a requesting entity. By way of a non-limiting example, the quantum job request can be downloaded directly and/or indirectly from the quantum operation component 203 and/or from the execution management system 202, received from the memory/storage 952 via the WAN 956, and/or downloaded via the WAN 956 from a node, such as a cloud computing node 1010 of a cloud computing environment 1050 (FIG. 10).

Employing the execution management system 202 and the quantum system 201, the non-limiting system 200 can execute one or more quantum programs, such as the quantum program 209, requested to be implemented in the quantum job request. In one or more cases, the quantum job request can include one or more execution instructions pertaining to one or more particular quantum circuits to employ.

In one or more embodiments, the execution management system 202 further can provide one or more processes and/or functions to serve as an instruction set emulator. For example, the execution management system 202 can include the scheduling component 210, time management component 212 and/or execution component 216. Alternatively and/or additionally, in one or more other embodiments, it will be appreciated that one or more functions, processes and/or components described herein can be employed and/or constructed to operate external to a simulated environment.

The scheduling component 210 can comprise and/or can be a scheduler and/or compiler. The scheduling component 210 can function to compile (e.g., schedule and/or identify) one or more execution aspects (e.g., one or more data transfers, instruction executions, aligned execution of one or more execution instructions, initiation points, wait points, dependencies and/or the like) at the one or more acting nodes 203A and 203B, to be described in detail below. One or more compiled initiation points, wait points and/or dependencies can be facilitated and/or fulfilled via scheduling of one or more data transfers by the scheduling component 210. The data transfers can be made via one or more communications/messages being transferred and comprising the data of the one or more data transfers.

The compiling can include review and/or simulation of a quantum program, such as the quantum program 209. Compiling these one or more execution aspects can enable the time management component 212 to maintain tracking of progress of the quantum program 209 during execution thereof. Indeed, as will be detailed below after further explanation of the one or more execution aspects, compiling such execution aspects can enable the time management component 212 to simulate one or more time cycles, time delays and/or the like, which can enable the quantum program 209 to be executed relative to precise clock cycle management and with high speed and/or efficiency, such as without invoking all nodes at each clock cycle.

It will be appreciated that one or more execution aspects can be compiled prior to initiation of the quantum program 209. Additionally and/or alternatively, one or more such execution aspects can be compiled during execution of the quantum program 209, e.g., at run time.

Referring now to the compilation of one or more different execution aspects, the scheduling component 210 can review and/or analyze the respective quantum program 209 to thereby compile one or more strings of one or more consecutive execution instructions. One or more execution instructions and/or strings thereof can be compiled for execution absent synchronization with another node. This synchronization-less execution can include execution absent alignment with another node (e.g., acting and/or control node), absent initial initiation, and/or absent a dependency on one or more other nodes (e.g., acting and/or control node).

The scheduling component 210 further can compile one or more dependencies upon another node, and/or one or more initiation points for receiving an execution instruction and/or for receiving data for enabling initialization of one or more execution instructions. As used herein, a dependency can refer to a measurement result, execution instruction and/or other data transfer that is to be received from another node (e.g., acting and/or control node) to enable a node, such as an acting node, to commence execution of one or more execution instructions. That is, the execution of the one or more instructions depending on the dependency cannot, in one or more cases, be executed absent fulfillment of the dependency.

Figure 3:
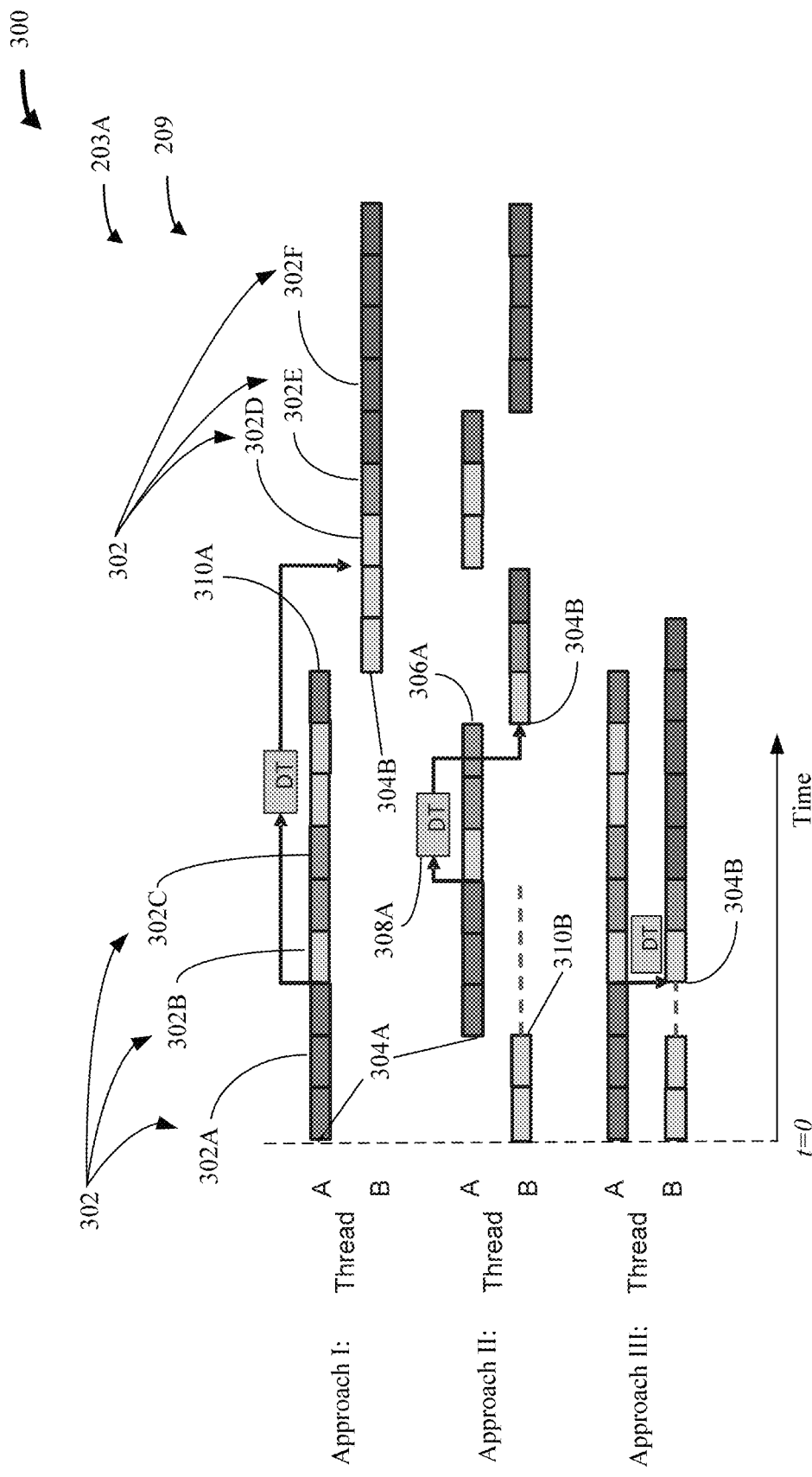
FIG. 3 illustrates a diagram of execution of execution instructions at a single node, as facilitated by the non-limiting system of FIG. 2, in accordance with one or more embodiments described herein.

For further example, looking to FIG. 3, a diagram 300 is illustrated relative to execution of one or more execution instructions 302 of the quantum program 209 at the acting node 203A. The diagram 300 is split into three different Approaches I, II and III of the quantum program 209.

Approach I illustrates a case of both threads A and B operating on a common processor, and in a sequential fashion. The execution instructions 302A-302C represent a string of execution instructions that can be compiled by the scheduling component 210 for execution in sequence, such as absent alignment with another node (e.g., acting and/or control node), absent initial initiation, and/or absent a dependency on one or more other nodes (e.g., acting and/or control node).

Approach II illustrates a case of both threads A and B operating on a common processor, but with toggling and/or task swapping between the threads A and B being enabled. Initiation points 304A and 304B can be identified by the scheduling component 210. That is, initiation (at 304A) of the execution instructions 302A-302C at Approach II can be provided via a communication, such as a data transfer, such as including an initiation instruction and or wake instruction, as will be described below in further detail.

Dependency 306A can be identified by the scheduling component, further causing identification of an initiation point 304B relative to fulfillment of the dependency 306A, such as via another communication, such as including a receipt of a data transfer (DT) 308A. While the data transfer 308A is shown as being received from the same acting node 203A, it will be appreciated that the data transfer 308A can be dependent upon one or more other data transfers external to the acting node 203A and not particularly shown.

Also at one or more later points of the execution, one or more wait points, such as the wait points 310A and 310B, can be identified by the scheduling component 210, where one or more execution instructions will be finished executing, but where additional execution instructions are scheduled later, will be dependent upon a dependency (e.g. at 304) and/or include a separate initiation point (e.g., at 304A).

Approach III illustrates a case of threads A and B operated at different processors, and being operated concurrently, providing a high performance case. For example, absent task swapping or toggling, initiation point 304D at Approach III can be achieved upon execution of instructions 302A at Approach III, and absent full execution of instructions 302B and 302C at Approach III, unlike at Approach II. As illustrated from left to right at Approaches I, II and III, e.g., along a time axis, threads A and B can be operated with higher performance at Approach III, as compared to Approaches I and II.

It will be appreciated that not all initiation points, dependencies, wake points and/or execution instructions are labeled at FIG. 3. Rather, certain initiation points, dependencies, wake points and/or execution instructions have been labeled for purposes of the above-provided explanation. Nonetheless, the scheduling component 210 can identify one or more, such as all, initiation points, dependencies, wake points and/or execution instructions relative to one or more acting nodes for execution of the quantum program 209. For example, in FIG. 3 the third instruction (third block of 302A) on thread A generates data that is to arrive before the third instruction (third block at 302D) of thread B. That is, thread B has a dependency on thread A, and so waits until the data (DT 308A) is available. This dependency exists and is to be satisfied regardless of the order of thread execution, as each of the three Approaches illustrates.

Still referring to FIG. 3, it will be appreciated that the scheduling component 210 can partition the identified execution instructions to be executed at an acting node into one or more threads, such as to allow for easier or more efficient execution at the acting node and/or for easier and/or more efficient monitoring by the time management component 212, to be further detailed. For example, FIG. 3 illustrates execution instructions 302 at the acting node 203A having been partitioned by the scheduling component 210 into a thread A and a thread B. In an example, in a simulation environment, each acting node could be a thread. When running on a machine or machines with multi-threaded support, tangible speed up of the respective simulation can be achieved by running the threads in parallel (e.g., such illustrated at Approach III). If all dependencies are identified and handled efficiently by the simulator, e.g., the scheduling component 210, the order of thread execution can vary machine-to-machine or run-to-run on the same machine while still obtaining a same result even though timing variances can occur on or between machines (e.g. memory collisions, message bottlenecks, cache misses and/or the like).

Relative to the various scheduling aspects, such as one or more initiation points, dependencies, wake points and/or execution instructions, that can be identified by the scheduling component 210 at least partially prior to execution of the quantum program 209, it will be appreciated that the one or more nodes of the non-limiting system 200, such as the acting nodes 203A and 203B, can be constructed to perform one or more functions corresponding thereto (e.g., to the various scheduling aspects). For example, the one or more acting nodes can operate in a particular execution state, such as an active state or a wait state. An active state can refer to a state where one or more execution instructions are being performed and/or operated. A wait state can refer to a state where no execution instruction is being performed and/or operated. The wait state of a node can comprise at least a partial sleep state, for example idling or swapping out a thread to let another execute. A trigger can wake the node from the wait state to the active state, which trigger can be provided by the time management component 212, to be described below.

In one or more embodiments, one or more additional execution states (e.g., state types) can be employed by the one or more nodes. For example, a node can employ an initial state prior to the start of the quantum program. The initialization of one or more execution instructions at a node in the initial state can be provided via an aforementioned trigger and/or by another component of the non-limiting system 200. For example, a counter at each node can be started in unison, such as via the quantum processor 205 and/or quantum operation component 207.

A node can employ a halt state where no further execution instructions are scheduled to be performed on that node, but where other nodes still can have one or more execution instructions to execute. When in the halt state, a node can continue to receive data transfers which may or may not be considered problematic (e.g. an individual message to a halted node can be an error while receiving a copy of a system wide broadcast message is not). An error state can be entered from any other state, such as where an error or architectural violation is detected and/or encountered. An abort state can be entered from any other state, such as where one or more nodes are directed to stop current and/or future execution of one or more execution instructions. The direction to enter the abort state can be provided by a trigger provided by the time management component 212, to be described below. A terminate state to tear down the simulation can be entered, such as when all nodes are in halt and no messages remain to be delivered.

To summarize one or more aspects of the description above, various execution aspects, such as one or more data transfers, initiation points, dependencies, wake points and/or execution instructions can be identified by the scheduling component 210. One or more nodes, such as one or more acting nodes and/or one or more control nodes can be constructed to operate in one or more particular execution states (e.g., active state, wake state, initial state, halt state, error state, abort state and/or terminate state) that can correspond to the various scheduling aspects.

Turning now again to FIG. 2, and to one or more functions of the time management component 212, advancement of time/counts at the local counters of the nodes (e.g., acting nodes 203A and/or 203B), and switching between the one or more various execution states, will be further detailed.

First, switching between one or more of the various execution states can be managed by the time management component 212 or by local management at the one or more nodes by the one or more nodes.

For instance, switching from an active state to a waiting state can be controlled by a local node having the states, in that the local node can recognize when it directs execution of an instruction with a dependency.

Alternatively, switching from a waiting state to an active state can be controlled by the time management component, such as via delivering the dependent data upon which the node in the waiting state is waiting. Likewise, recognition that one or more dependencies have been fulfilled and/or that one or more initiation points have been reached also can be managed by the time management component 212, instead of via local management at the one or more nodes (e.g., acting nodes 203A and 203B). In this way, computing power and memory at the one or more nodes can be focused toward executing execution instructions and/or precise timing can be employed for instruction execution without complex instruction scheduling and/or without high granularity invocation of input processing (e.g., at every clock cycle at all nodes).

One or more examples of the communications by the time management component 212 are now provided to further illustrate the time management conducted by the time management component 212. For example, the time management component 212 can send individual data transfers to one or more of the acting nodes 203A and 203B to individually trigger one or more of these nodes for execution of one or more individual instructions, such as one or more execution instructions scheduled by the scheduling component 210. That is, the one or more acting nodes 203A and 203B can be triggered from a waiting state to a respective active state via the time management component 212.

Indeed, the one or more acting nodes 203A and/or 203B can operate under local control to control instruction execution once triggered until a wait state is activated. The wait state can be activated by completion of one or more execution instructions, such as at a wait point (e.g., a wait point 310A at FIG. 3) and/or at via encountering a dependency (e.g., a dependency 306A at FIG. 3). The time management component 212 can subsequently control activation of switching of the wait state to an active state at the acting nodes 203A and/or 203B for initiating the execution of one or more execution instructions at the acting nodes 203A and/or 203B.

Likewise, the time management component 212, via one or more communications, such as one or more data transfers, data pings and/or other triggers, can trigger a switch to a halt state, abort state and/or any other suitable execution state defined herein or otherwise deemed to be suitable.

Next, advancement of a counter at each node (e.g., acting node 203A and/or 203B) can be managed by the time management component 212 (e.g., global management) or by local management at the one or more nodes by the one or more nodes.

First, it will be appreciated that a node (e.g., acting node 203A and/or 203B) can self-advance its respective local counter where instructions being executed are not dependent upon a message and/or data. For example, a node in the active state can update its local TOD counter from the respective local counter at the node, increasing it based on the number of cycles each executed instruction consumes. However in the wait state, the node cannot update its local TOD counter since the node does not have awareness of how long it will take for the data it is waiting for to arrive.

Alternatively and/or additionally, a time management component, such as a time manager, e.g., the time management component 212, generally can control time management of execution the quantum program 209 at one or more nodes, such as the acting nodes 203A and/or 203B. Generally, the time management component 212 can communicate with one or more nodes (e.g., the acting node 203A and/or 203B) to trigger the node to execute one or more quantum program instructions (e.g., execution instructions) relative to a counter (e.g., a local counter) at the respective node(s) that is advanced by the communicating. That is, one or more communications by the time management component 212, such as including one or more data transfers (e.g., such as having been compiled via the scheduling component 210), can control triggering of the one or more nodes, such as the acting nodes 203A and 203B and/or advancement of local counters at the one or more nodes, such as for executing the quantum program 209. One or more same and/or different communications by the time management component 212 can advance a local counter at the one or more nodes based upon access by the time management component 212.

That is, one or more communications via the time management component 212 can enable the time management component 212 to facilitate synchronization at and/or between the one or more individual counters at the one or more nodes, e.g., TOD counters at the acting nodes 203A and 203B. The individual counters can be comprised by and/or be accessible to the time management component 212 and/or execution management system 202 by any suitable method of communication. The individual counters can be triggered to start at any suitable start count, such as 0, such as by the time management component 212, execution management system 202 and/or quantum system 201, such as upon initiation of execution of the quantum program 209.

Generally, the time management component, e.g., time management component 212, that is monitoring the issuance of data from all nodes, can advance the (waiting) node's TOD counter to the message delivery time that is forecast by the sender (e.g., sender node) as a combination of the sender's TOD when issued and the propagation delay of message delivery, such as based on physical characteristics of the system being simulated. The time management component 212 can deliver the message, such as based on the state of all nodes and/or on any message precedence rules that might apply based on the system being modelled. A detailed description of this function will now be provided.

For example, via the one or more data transfers, data pings and/or other triggers, the time management component 212 can reset a counter at a node, such as when initially triggering the node. This "reset" can initialize the local counter at a node. As the node executes instructions that have no dependencies, the node can self-update the counter. When a dependency occurs in the instruction stream and the node, via the respective message delivery rules (e.g., order of precedence based on message type or prioritization of sending nodes when message collisions arise), waits for data to arrive from another node (e.g., a sending node), a data transfer containing the dependent data can be sent by the another node to trigger the waiting node (e.g., by passing a qubit measurement value). That is, the time management component 212 can receive and or intercept the dependent data from the another node. The time management component 212 can then deliver the message (i.e., from the another node to the waiting node) and can advance the waiting node's counter (i.e., now the receiving node) to the time when the message would arrive in hardware (e.g., if not being simulated), such as via the same message and/or communication comprising the message.

The time management component 212 can advance a node's local counter based upon a combination of time of another node and of determined actual propagation time for a message. In the aforementioned case, the time management component 212 can advance the receiving node's local counter based upon a combination of the time of the another node and of a determined actual propagation time for the message comprising the dependent data from the another node. Put another way, the new time, advanced to at the receiving node's local counter by the time management component 212, can be a combination of the sending node's counter value when the message is issued, plus a message propagation time based on the physical system characteristics. The physical system characteristics can be of an actual system or of a hypothetical system. The physical system characteristics can be unique (e.g. cable lengths can differ between physical components) and can be determined by the time management component 212 and/or by the scheduling component 210 during compiling of the execution instructions and/or during run time It will be appreciated that additionally and/or alternatively, separate communications can be employed by the time management component 212 for local counter control and instruction execution control.

Including the propagation delay can enable the simulated and real implementations of the receiving node (i.e., the waiting node) to restart execution (e.g., after the waiting state) at the same time relative to all the other nodes in the system. If the simulated and real node do not function the same, the cycle accurate output waveforms produced across all nodes (e.g., employed by and/or observed by the qubits) can be undesirably different between simulated and real implementations, which can undesirably diminish the efficiency and/or function of the simulation.

In one or more embodiments, the acting node can send and/or load a message for being sent, to the time management component 212 including a cycle count and/or TOD count when the wait state is activated. In this way, the time management component 212 can verify and/or further track advancing cycles at the one or more acting nodes.

The control via the time management component 212 can allow for one or more nodes to enter a wait state. In such case, an underlying machine running a node's thread, such as including a respective processor, can enter a sleep mode to consume less compute power, or the node's thread can be swapped out so another thread waiting for compute resources can begin execution. A side effect of using the time management component 212 this way can be loss of synchronization between counters at the various nodes. Indeed, a node can have a counter that is at a different execution time ahead of or behind one or more other nodes when viewing the system as a whole at any given instant during a simulation. However, with the correct message delivery rules, which can be unique to each physical system, being employed by the time management component 212, a same result in terms of cycle accurate waveforms produced by all nodes can be generated regardless of an order taken by the various threads during one or more simulation runs.

Figure 4:
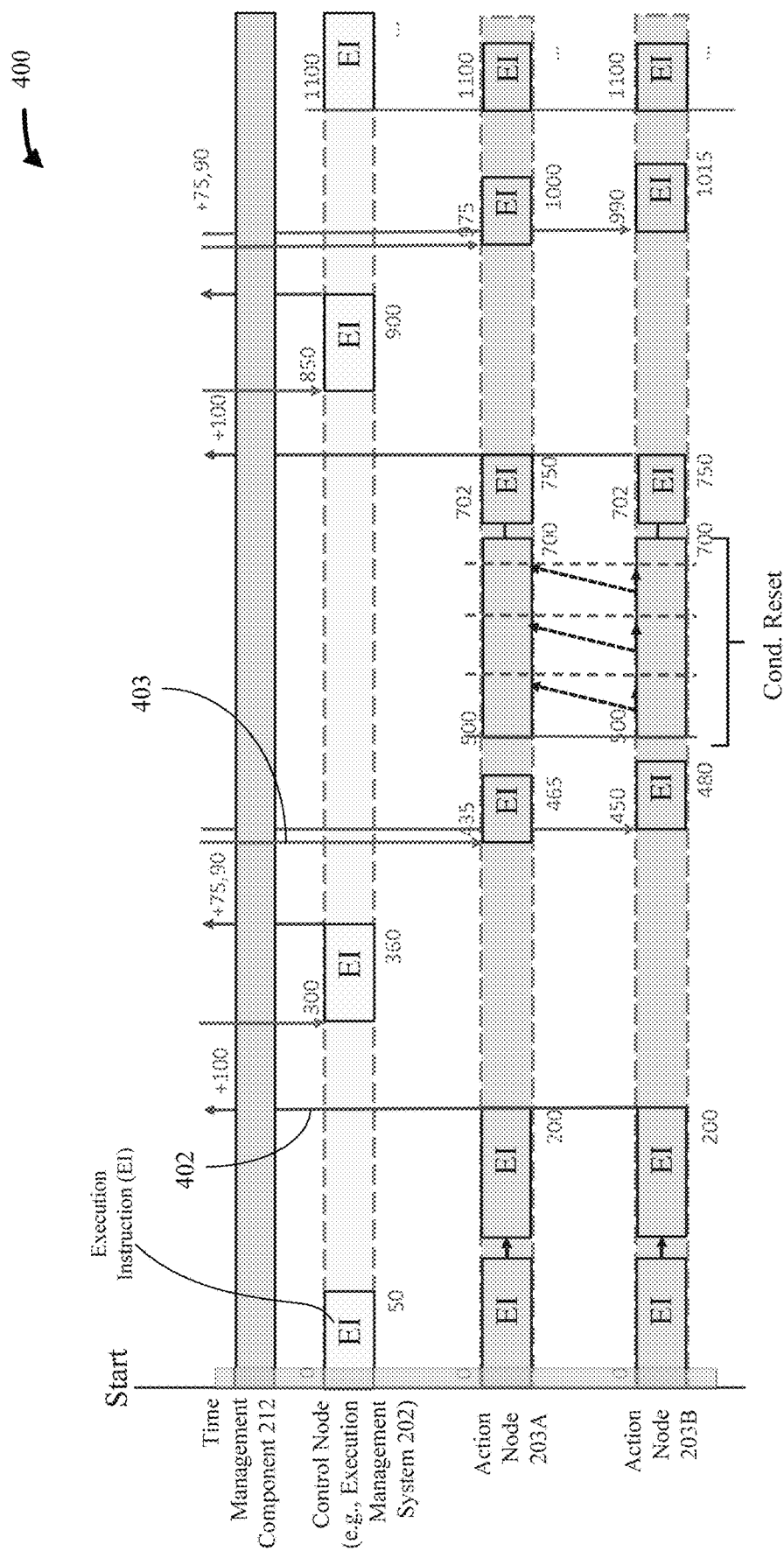
FIG. 4 illustrates another diagram of execution of execution instructions at a single node, as facilitated by the non-limiting system of FIG. 2, in accordance with one or more embodiments described herein.

Looking next to FIG. 4, and also still to FIG. 2, a diagram 400 of execution of instructions at the non-limiting system 200 is illustrated. This diagram 400 provides further illustration of the time management component 212 employing various data transfers 402 relative to the initiation points, wait points and/or dependencies of the execution instructions (EI) executed at a control node, acting node 203A and acting node 203B. Further explanation regarding FIG. 4 will now be provided relative to control of the time management component 212 of one or more counters at the one or more nodes, e.g., the acting nodes 203A and 203B, of the non-limiting system 200.

For example, the time management component 212 can reset local counters at the acting nodes 203A and/or 203B. In one example, data transfer 403 to acting node 203A can reset a local counter at the acting node 203A to count 435. Likewise, the one or more nodes, e.g., acting node 203A and 203B, can communicate the counts at their respective local counters when entering a wait state and/or halt state.

Figure 5:
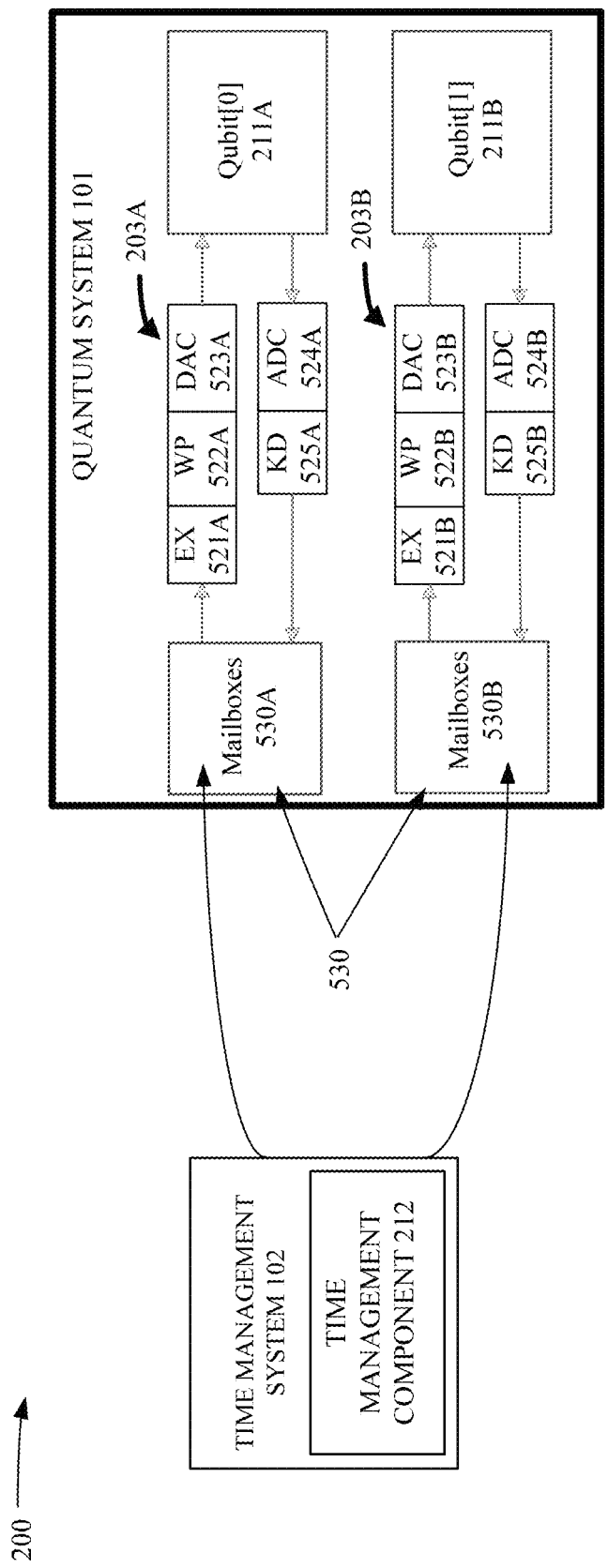
FIG. 5 illustrates another block diagram of the non-limiting system that can facilitate time management of a quantum program at one or more nodes of a system, in accordance with one or more embodiments described herein.

Turning to FIG. 5, and also still to FIG. 2, the communication by the time management component 212 can be facilitated, at least in part, by one or more mailboxes 530, which can be generated by the execution component 216.

The time management component 212 can employ the one or more mailboxes 530 at one or more nodes, such as the acting node 203A and/or 203B, where the one or more mailboxes 530 can dynamically alter a mailbox designation of the one or more mailboxes 530. The mailbox designation can relate to an execution state of the node, such as an active, wait, initial, halt, error and/or abort state. That is, in one or more embodiments, the various execution states of the nodes can be non-directly communicated with the time management component 212 via the one or more mailboxes 530. The mailbox designation generally can allow for monitoring of execution of the quantum program (e.g., quantum program 209) at the nodes by time management component 212 during execution of the quantum program. Indeed, the one or more designations can provide notice to the time management component 212 of one or more actions and/or processes for the time management component 212 to perform relative to the one or more nodes, such as the acting node 203A and/or the acting node 203B, to now be described in greater detail.

Looking to FIG. 5, one or more, such as each, of the acting nodes 203A and 203B can include one or more acting node components, such as an expander (EX), waveform player (WP), digital to analog converter (DAC) device, analog to digital converter (ADC) device and/or kernel/discriminator (KD). In one or more embodiments, one or more functions of one or more acting node components can be performed by another one or more of the acting node components. In one or more embodiments, one or more of the acting node components can be combined and/or omitted.

The acting node 203A can function to operate on at least one qubit, such as qubit 211A. Likewise the acting node 203B also can function to operate on at least one qubit, such as qubit 211B. Additionally, it will be appreciated that while only two qubits are shown, additional acting nodes can be included to act on additional qubits, such as 7 or more qubits, 10 or more qubits and/or 100 or more qubits, for example, in one or more other embodiments.

Referring now to the acting node 203A, but also applicable to the acting node 203B, one or more aspects of the acting node 203A will be described in detail. The acting node 203A can include an expander (EX) 521A, waveform player (WP) 522A, digital to analog converter (DAC) device 523A, analog to digital converter (ADC) device 524A and kernel/discriminator (KD) 525A and can act on qubit(0) 211A. The expander 521A can convert condensed information about quantum gates into a sequence of one or more quantum gates. At least a portion of the sequence can be compiled at a database external and/or internal to the non-limiting system 200. The waveform player 522A can convert the sequence of two or more quantum gates into code points for utilization by the DAC device 523A. For example, the waveform player 522A can reference a library of code points representing one or more quantum gates with which to build a sequence of code points. The library of code points can be stored at a database external and/or internal to the expanded non-limiting system 200. The DAC device 523A can convert the sequence of code points to one or more analog signals, such as an analog control signal and/or an analog measurement signal. During a time window of measurement of a state of a qubit, such as of the qubit(0) 211A, the ADC device 524A can sample one or more of the analog signals to produce one or more digital codes representing voltage.

The kernel/discriminator 525A can convert one or more samples of measurement into binary representing a state of the qubit. In one or more other embodiments, the kernel/discriminator 525A can convert one or more samples of measurement into one or more binary states, such as where a binary string can be employed and/or passed around to represent one or more of the states (e.g., four distinct quantum states defined as 00, 01, 10 and 11). The kernel/discriminator 525A can output a qubit value for the qubit(0) 211A. Furthermore, although not particularly shown at FIG. 5, in one or more embodiments, a qubit measurement output from a kernel/discriminator can feed into the respective expander, into a different expander and/or be broadcast to two or more nodes in a respective system.

One or more mailboxes 530 can be generated, such as by the execution component 216 and/or by time management component 212, such as during compilation of execution instructions. In one or more embodiments, one or more mailboxes 530 can be generated at least partially during run time by the execution component 216, time management component 212 and/or the kernel/discriminator components 525. At least one mailbox 530 can be employed per acting node, such as mailbox 530A relative to acting node 203A and mailbox 530B relative to acting node 203B. The execution component 216 can identify and/or employ one or more hardware and/or software aspects of the non-limiting system 200, and/or external to the non-limiting system 200, to realize the mailboxes 530. In one or more embodiments, a software aspect can include or be a part of a cloud network. A hardware aspect can include one or more physical hardware components, such as routers, servers, cables, routing boxes, custom hardware interfaces and/or the like.

As indicated, the mailboxes 530 can employ a variety of designations relative to the execution state of the respective nodes. A designation at a mailbox 530 can be dynamically switched, such as by the time management component 212 and/or by the node comprising the respective mailbox 530. The designations can be monitored by the time management component 212 to thereby indicate, direct and/or suggest performance by the time management component 212 of one or more compiled and/or non-compiled execution aspects, such as data transfers.

In one or more embodiments, the mailbox designations employed can include empty, loaded, delivered and read designations. An empty designation can indicate that a mailbox 530 is not in use, and thus the mailbox 530 can be loaded with a new data transfer, such as a message. A loaded designation can indicate that a mailbox 530 contains a message. The time management component 212 can change the loaded designation to a delivered designation when the data transfer that is loaded is to be employed, such as to trigger a node to switch from a wait state to an active state. A delivered designation can indicate that a mailbox 530 is visible to the receiver node. The receiver node (e.g., the node comprising the mailbox 530) can change the delivered designation to a read designation, such as when contents begin to be extracted by the receiver node. This change can indicate to the time management component 212 that the receiver node is properly functioning. A read designation can indicate that a receiver node can act upon, such as immediately act upon, the contents of the data transfer and/or make a copy of the data transfer for later processing. After a receiver node acts upon the data transfer and/or makes a copy thereof, the receiver node can change the mailbox designation back to the empty designation.

In one or more embodiments, the mailboxes 530 can be point-to-point, allowing for one sender and one receiver. For example, mailboxes 530 can be uniquely identified by sender node ID and channel, receiver node ID and channel and/or multi-cast group (MCG). Use of point-to-point mailboxes can allow delivery times to be customized to each data transfer.

Further, it will be appreciated that one or more embodiments of the non-limiting system 200 can employ the general mechanism of a mailbox in one or more different ways, or even replace one or more mailboxes with a different mechanism. However, in the described embodiment relative to FIG. 5, the mailbox designations allow ownership/control of the mailboxes to be clearly defined and controlled. That is, in the empty state, the sending node can control write access to a respective mailbox. This can allow the sending node to immediately fill the respective mailbox with data once new information to share with other nodes becomes available.

In the resultant loaded state of the respective mailbox, ownership/control can transfer to the time management component 212, which can be responsible for presenting the mailbox to a receiving node at a correct time, given a state of the receiving node (e.g. waiting or active) and given the message delivery rules (e.g., order of precedence based on message type or prioritization of sending nodes when message collisions arise).

In the delivered state, the respective mailbox ownership/control can be by the receiving node. The delivered state can indicate that the mailbox contents are ready for the receiving node to process, but that processing has not yet begun.

In the subsequent read state, the receiving node can have opened the respective mailbox and begun to process contents of the respective mailbox. Mailbox ownership can remain with the receiving node. In one or more embodiments, a read state can be considered an optional state, but the read state can be useful for debug to enable a distinction between delivered and read states. When the receiving node is done processing the respective mailbox contents, the receiving node can set the mailbox designation back to the empty state to repeat the cycle.

Allowing only one sender and one receiver per mailbox allows different and unique propagation times to exist between nodes, which can enable the simulation by the execution management system 202 of a physical system (e.g. cable lengths can differ between physical components). While this exemplary embodiment breaks one broadcast operation into multiple mailboxes (one per receiver), it will be appreciated that a different embodiment could implement a mailbox structure where a broadcast message contains one sender and multiple receivers each with a different path delay.

Additionally, a mailbox 530 can include one or more fields and/or sub-registers and/or mailboxes of different types can be employed at one or more nodes. Each of the one or more fields and/or sub-registers and/or mailboxes of different types can employ the various mailbox designations discussed above. In one or more embodiments, the one or more fields, sub-registers and/or mailbox types can include broadcast, qubit value, time of day compare and/or receive qubit under mask. A broadcast field, sub-register and/or mailbox type can be employed to send and/or receive a same message in a plurality of mailboxes 530. A qubit value field, sub-register and/or mailbox type can be employed to send and/or receive a qubit measurement. A time of day compare field, sub-register and/or mailbox type can be employed for a node to send and/or receive data transfers to and from itself, as controlled by the time management component 212. Time of day compare can be a mechanism used for synchronization, whereby a node can suspend instruction execution until a specific, future TOD is reached. A receive qubit under mask field, sub-register and/or mailbox type can be employed to wait for one or more qubit measurements to occur before continuing instruction execution. This can be used by the classical part of the quantum algorithm (e.g., a control node), to hold off determining a future direction of the test until the current sub-part of it completes.

An analysis component 218 can employ one or more aspects of an operating environment, such as the operating environment 900 illustrated at FIG. 9, to provide, such as to receive, retrieve and/or otherwise obtain, one or more experiment results, such as quantum results, from the quantum system 201, such as relative to the one or more qubits 211 operated on. By way of a non-limiting example, the one or more experiment results can be downloaded directly and/or indirectly from the quantum operation component 203 and/or from the execution management system 202, received from the memory/storage 952 via the WAN 956 and/or downloaded via the WAN 956 from a node, such as a cloud computing node 1010 of a cloud computing environment 1050 (FIG. 10).

The execution management system 202 also can comprise an output component 220. One or more measurement results can be output from the non-limiting system 200 via the output component 220. The one or more measurement results can comprise and/or can be based at least in part on the one or more quantum results output from the quantum system 201 and/or can be responsive to a quantum job request from a requesting entity. For example, the measurement results can comprise one or more measurements regarding one or more states of the one or more of the qubits 211 of the quantum system 201.

In summary, the one or more embodiments described herein can enable improved performance of a quantum system, such as of a simulated quantum system, by at least partially globally managing locally managed counters at the one or more acting nodes of the quantum system. Local counters can be independently advanced by the respective node and/or by an execution management system of the one or more embodiments. Performance at the one or more acting nodes can be dedicated to executing instructions to advance a respective quantum program. Further, instructions can be modeled by the scheduling component absent modeling of instructions and/or portions thereof to align execution at one or more acting nodes and/or to address one or more dependencies among the one or more acting and/or control nodes. Instead, one or more embodiments described herein can manage triggering of one or more acting nodes to enable alignment. The one or more embodiments described herein also can manage transfer of data among the control and/or acting nodes to trigger initiation of one or more acting nodes upon a dependency being fulfilled. This global management of alignment and/or initiation upon dependency fulfillment likewise can enable performance at the one or more acting nodes instead to be dedicated to executing instructions to advance a respective quantum program. Likewise, the global management of alignment can enable an associated scheduler to perform less complex modelling of logic and/or instructions for execution of the respective quantum program.

In one or more cases, one or more embodiments described herein can allow for increased scaling of execution of one or more quantum programs in view of increased execution time and/or execution quality. Additionally and/or alternatively, employing the described subject matter can allow for reduced cost and/or complexity of a system employed to execute a quantum program according to the described subject matter. This allowance can be due at least to the employment of low amounts of memory, time and/or computing power at the one or more acting nodes of a quantum system in view of global time management at and/or across one or more other nodes, such as one or more control nodes, of the system.

Figure 6:
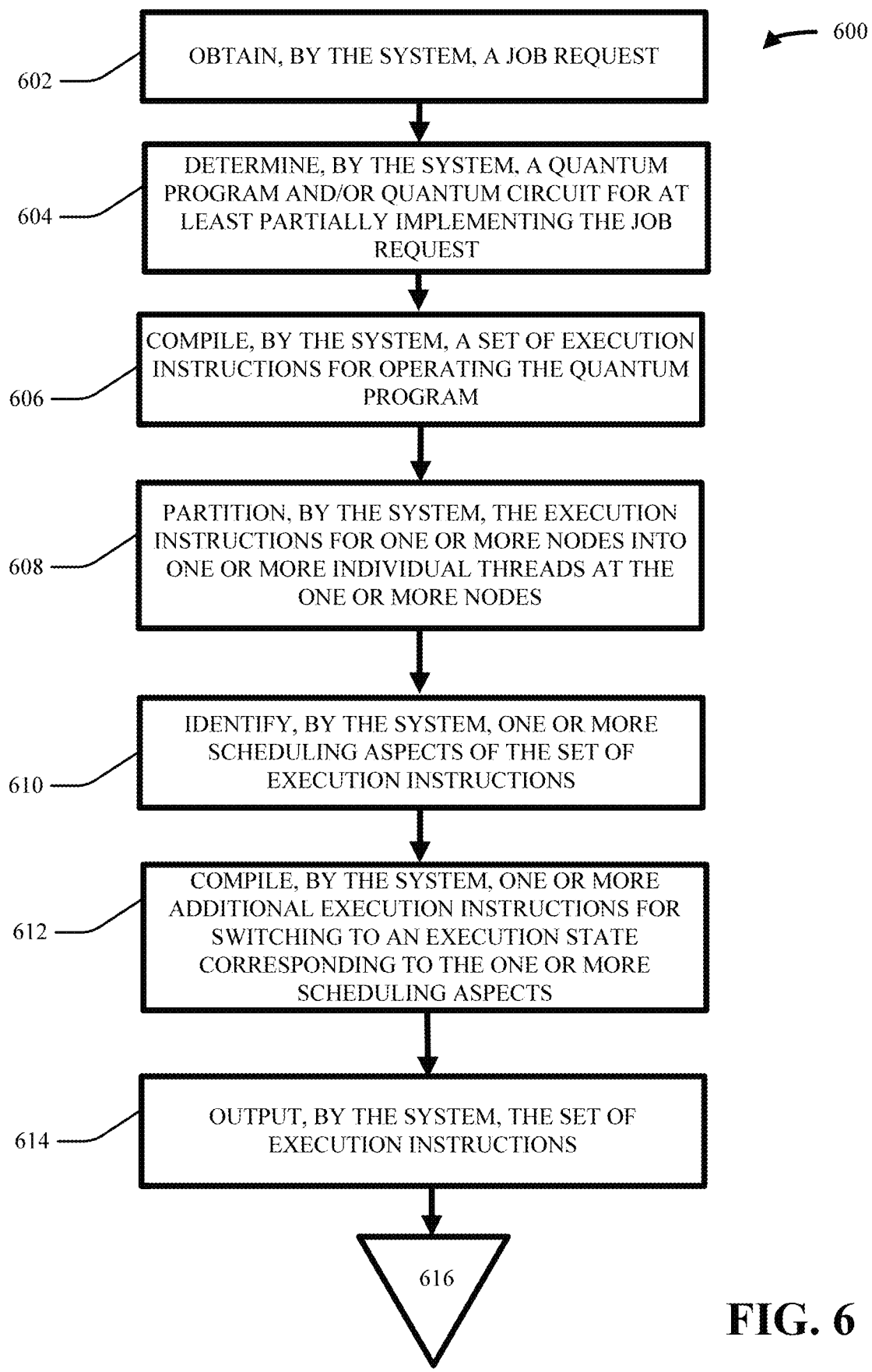
FIG. 6 illustrates a flow diagram of an example, non-limiting computer-implemented method that can facilitate time management of a quantum program at one or more nodes of a system, in accordance with one or more embodiments described herein.
Figure 7:
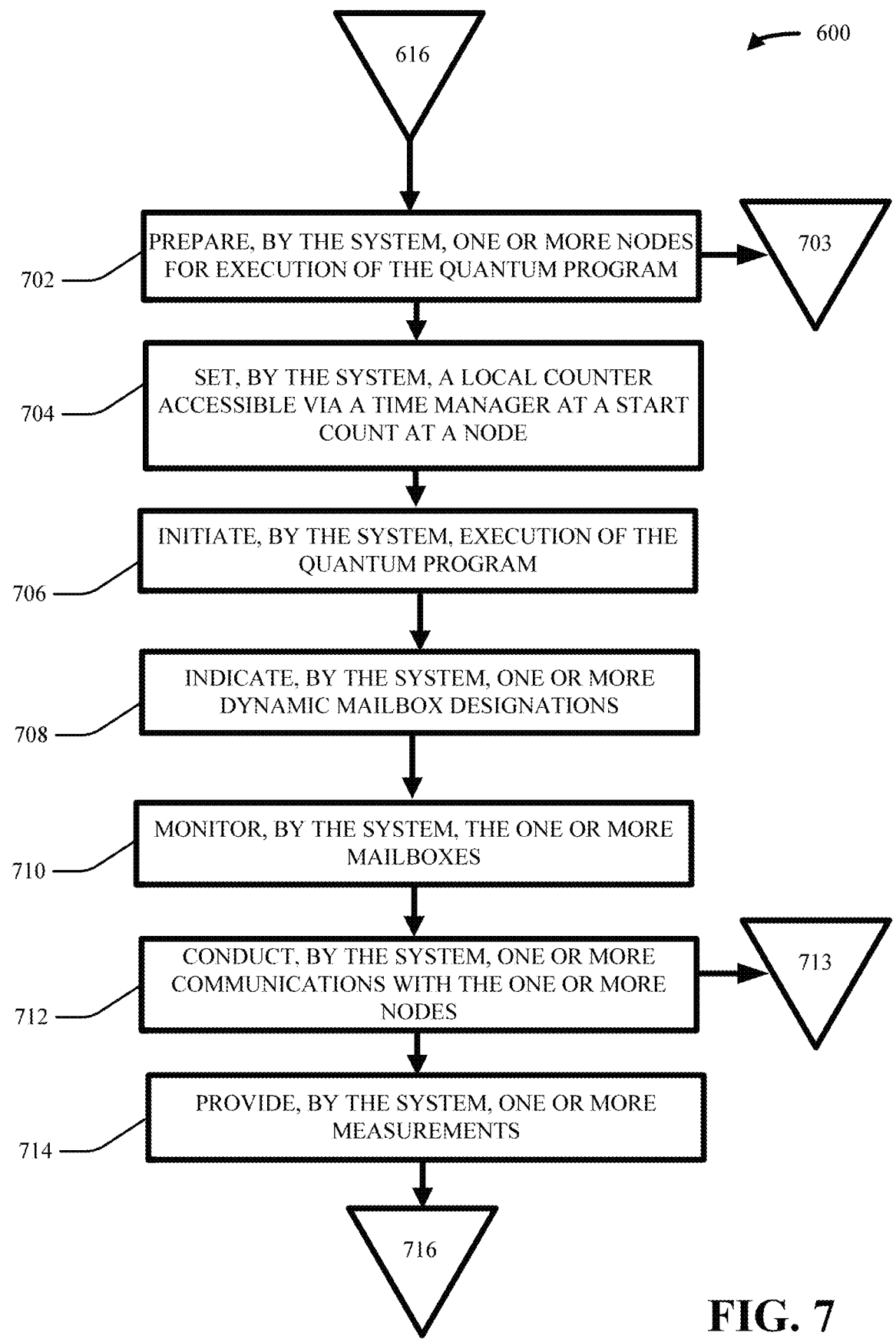
FIG. 7 illustrates a continuation of the flow diagram of FIG. 6, of an example, non-limiting computer-implemented method that can facilitate time management of a quantum program at one or more nodes of a system, in accordance with one or more embodiments described herein.
Figure 8:
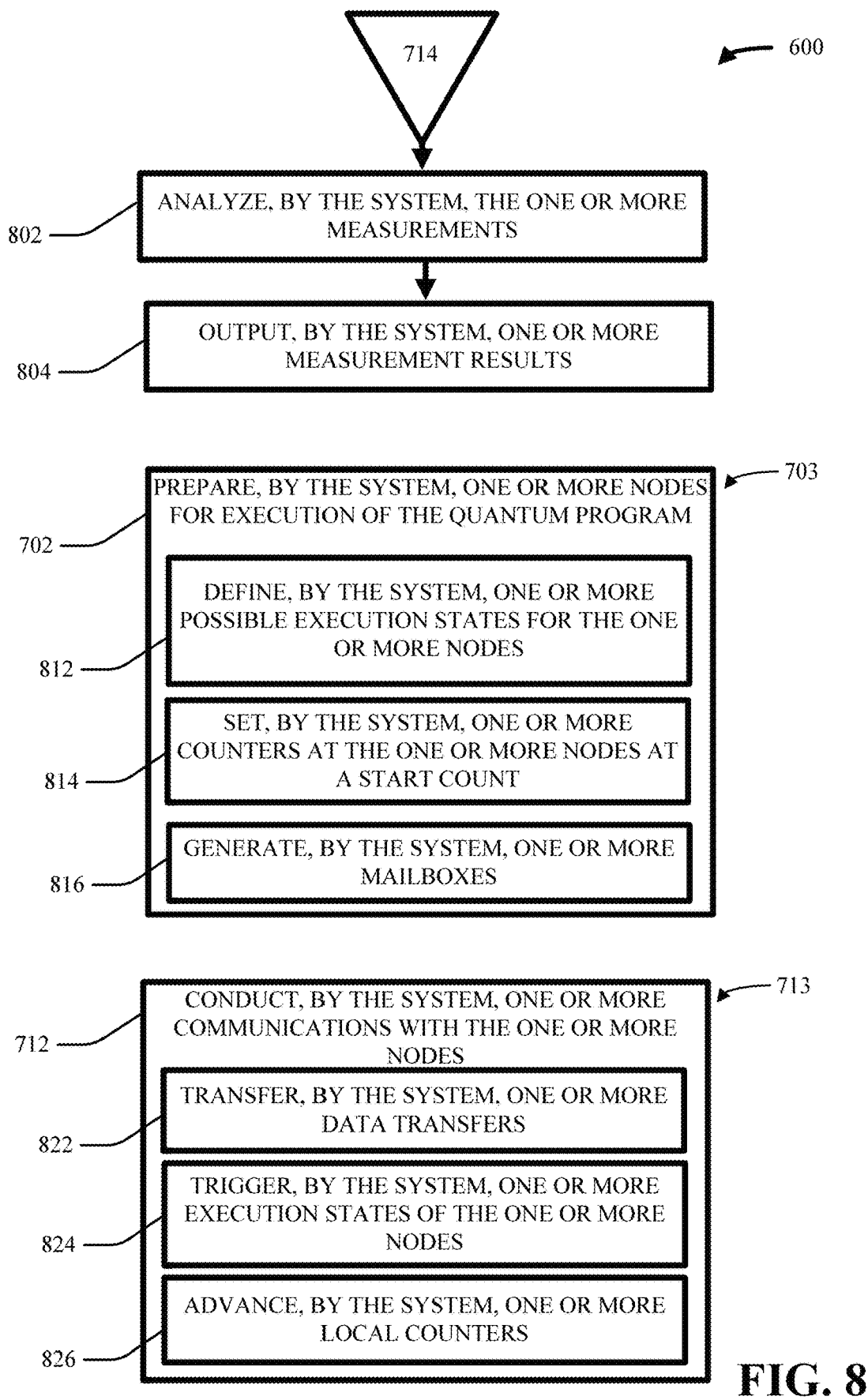
FIG. 8 illustrates another continuation of the flow diagram of FIG. 6, of an example, non-limiting computer-implemented method that can facilitate time management of a quantum program at one or more nodes of a system, in accordance with one or more embodiments described herein.

Turning now to FIGS. 6-8, these figures together illustrate a flow diagram of an example, non-limiting computer-implemented method 600 that can facilitate time management of a quantum program at one or more nodes of a system, in accordance with one or more embodiments described herein with respect to the non-limiting system 200. It will be appreciated that while the computer-implemented method 600 is described relative to the non-limiting system 200, the computer-implemented method 600 can be applicable also to the non-limiting system 100. Repetitive description of like elements and/or processes employed in respective embodiments is omitted for sake of brevity.

Looking first to 602 at FIG. 6, the computer-implemented method 600 can comprise obtaining, by a system (e.g., via non-limiting system 200, execution management system 202 and/or job determination component 208) operatively coupled to a processor (e.g., processor 206, a quantum processor and/or like processor) a job request (e.g., a quantum job request).

At 604, the computer-implemented method 600 can comprise determining, by the system (e.g., via non-limiting system 200, execution management system 202 and/or job determination component 208), a quantum program (e.g., quantum program 209) for at least partially implementing the job request (e.g., quantum job request).

At 606, the computer-implemented method 600 can comprise compiling, by the system (e.g., via non-limiting system 200, execution management system 202 and/or scheduling component 210), a set of execution instructions (e.g., including one or more execution instructions) for operating the quantum program (e.g., quantum program 209) on the quantum system (e.g., quantum system 201, such as on one or more qubits 211).

At 608, the computer-implemented method 600 can comprise partitioning, by the system (e.g., via non-limiting system 200, execution management system 202, time management component 212 and/or scheduling component 210), the execution instructions for one or more nodes (e.g., acting node 203A and/or acting node 203B) into one or more individual threads (e.g., such as thread A and thread B as illustrated at FIG. 3) at the one or more nodes (e.g., acting node 203A and/or acting node 203B).

At 610, the computer-implemented method 600 can comprise identifying, by the system (e.g., via non-limiting system 200, execution management system 202, time management component 212 and/or scheduling component 210), one or more scheduling aspects (e.g., initiation points, wait points and/or dependencies) of the set of execution instructions.

At 612, the computer-implemented method 600 can comprise compiling, by the system (e.g., via non-limiting system 200, execution management system 202, time management component 212 and/or scheduling component 210), one or more additional execution instructions for switching one or more nodes (e.g., acting node 203A and/or acting node 203B) to an execution state (e.g., initial state, halt state, error state, abort state, active state, wait state and/or terminate state) corresponding to the one or more scheduling aspects identified.

At 614, the computer-implemented method 600 can comprise outputting, by the system (e.g., via non-limiting system 200, execution management system 202 and/or scheduling component 210), the set of execution instructions.

Turning now to FIG. 7, this figure illustrates an extension of the computer-implemented method 600 of FIG. 6, and particularly illustrates aspects that can occur at continuation triangle 616 of FIG. 6.

At 702, the computer-implemented method 600 can continue from the continuation triangle 616 and can comprise preparing, by the system (e.g., via non-limiting system 200, execution management system 202, time management component 212 and/or execution component 216 the one or more nodes (e.g., acting node 203A and/or acting node 203B) for execution of the quantum program. One or more processes comprised by this preparing step are illustrated at FIG. 8, employing continuation triangle 703.

At 704, the computer-implemented method 600 can comprise setting, by the system (e.g., via non-limiting system 200, execution management system 202 and/or time management component 212) a local counter accessible via a time manager (e.g., the time management component 212) at a start count (e.g., 0) at a node (e.g., acting node 203A or 203B).

At 706, the computer-implemented method 600 can comprise initiating, by the system (e.g., via non-limiting system 200, execution management system 202, time management component 212, scheduling component 210, quantum system 201, quantum processor 205A, 205B and/or quantum operation component 207A, 207B), execution of the quantum program (e.g., quantum program 209).

At 708, the computer-implemented method 600 can comprise indicating, by the system (e.g., via non-limiting system 200, execution management system 202, time management component 212 and/or execution component 216), one or more dynamic mailbox designations (e.g., empty, loaded, delivered and/or read designations of the mailboxes 530).

At 710, the computer-implemented method 600 can comprise monitoring, by the system (e.g., via non-limiting system 200, execution management system 202 and/or time management component 212), the one or more mailboxes (e.g., mailboxes 530).

At 712, the computer-implemented method 600 can comprise conducting, by the system (e.g., via non-limiting system 200, execution management system 202 and/or time management component 212), one or more communications with the one or more nodes (e.g., one or more acting nodes 203A and/or 203B). One or more processes comprised by this conducting step are illustrated at FIG. 8, employing continuation triangle 713.

At 714, the computer-implemented method 600 can comprise providing, by the system (e.g., via non-limiting system 200, analysis component 218, quantum system 201, quantum processor 205A, 205B and/or quantum operation component 207A, 207B), one or more measurements (e.g., quantum measurements of the one or more qubits 211).

Turning now to FIG. 8, this figure illustrates an extension of the computer-implemented method 600 of FIG. 7, and particularly illustrates aspects that can occur at continuation triangle 716 of FIG. 7.

At 802 the computer-implemented method 600 can comprise analyzing, by the system (e.g., via non-limiting system 200, analysis component 218, quantum system 201, quantum processor 205A, 205B and/or quantum operation component 207A, 207B), the one or more measurements (e.g., quantum measurements of the one or more qubits 211).

At 804, the computer-implemented method 600 can comprise outputting, by the system (e.g., via non-limiting system 200, execution management system 202 and/or output component 220) one or more measurement results (e.g., one or more measurement results 226).

Also at FIG. 8, this figures illustrates one or more processes after the continuation triangle 703 that can be performed at the preparing step 702 of FIG. 7. It will be appreciated that connection arrows are not employed to connect the process blocks 812, 814 and 816. This is to further exemplify that any one or all of these steps can be performed relative to the preparing step 702.

At 812, the computer-implemented method 600 can comprise defining, by the system (e.g., via non-limiting system 200, execution management system 202 and/or scheduling component 210) one or more possible execution states (e.g., initial state, halt state, error state, abort state, active state, wait state and/or terminate state) for the one or more nodes (e.g., acting node 203A and/or acting node 203B).

At 814 the computer-implemented method 600 can comprise setting, by the system (e.g., via non-limiting system 200, execution management system 202 and/or scheduling component 210), one or more counters at the one or more nodes (e.g., acting node 203A and/or acting node 203B) at a start count (e.g., 0).

At 816, the computer-implemented method 600 can comprise generating, by the system (e.g., via non-limiting system 200, execution management system 202, scheduling component 210, time management component 212 and/or execution component 216) one or more mailboxes (e.g., mailboxes 530) at the one or more nodes (e.g., acting node 203A and/or acting node 203B).

Further at FIG. 8, this figures also illustrates one or more processes after the continuation triangle 713 that can be performed at the conducting step 712 of FIG. 7. It will be appreciated that connection arrows are not employed to connect the process blocks 822, 834 and 836. This is to further exemplify that any one or all of these steps can be performed relative to the conducting step 712.

At 822, the computer-implemented method 600 can comprise transferring, by the system (e.g., via non-limiting system 200, execution management system 202 and/or time management component 212), one or more data transfers (e.g., including one or more measurements, instructions and/or other data) among the one or more nodes (e.g., one or more acting nodes 203A and/or 203B) and time management component (e.g., time management component 212). For example, one or more data transfers can be made to satisfy and/or to fulfill one or more dependencies, such as via provision of one or more measurements, instructions and/or other data.

At 824, the computer-implemented method 600 can comprise triggering, by the system (e.g., via non-limiting system 200 and/or execution management system 202), one or more execution states (e.g., initial state, halt state, error state, abort state, active state, wait state and/or terminate state) for the one or more nodes (e.g., acting node 203A and/or acting node 203B). This triggering can be provided at least in part to address one or more scheduling aspects (e.g., initiation points, wait points and/or dependencies).

At 826, the computer-implemented method 600 can comprise advancing, by the system (e.g., via non-limiting system 200, execution management system 202 and/or time management component 212), one or more counters at the one or more nodes (e.g., one or more acting nodes 203A and/or 203B). This advancement can be fulfilled via one or more data transfers and/or via one or more other communications, data pulses, and/or the like. For example, a time management component (e.g., time management component 212) can advance the counter at a node based upon a combination of time of another node (e.g., a sending node sending a data transfer) and of a determined actual propagation time for the communicating. The determined actual propagation time can be based upon one or more physical system characteristics that can be of an actual system or of a hypothetical system. The physical system characteristics can be unique (e.g. cable lengths can differ between physical components) and can be determined by the time management component 212 and/or by the scheduling component 210 during compiling of the execution instructions and/or during run time. The propagation time can comprise a simulated time from the sending node to the receiving node, based on the actual propagation time from the sending node, as intercepted by the time management component and analyzed by the time management component, and then transferred to the receiving node. Alternatively and/or additionally, the node can self-advance the counter relative to execution of one or more quantum program instructions that are not dependent upon the communicating.

For simplicity of explanation, the computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

Turning now to the FIGS. 2-8 in combination, and still to the non-limiting system 200 and execution management system 202, one or more embodiments as described herein can provide a new approach driven by previously unincorporated time management of execution of instructions at one or more nodes of a system.

A practical application of the execution management system 202 and/or non-limiting system 200 is that it can be implemented in one or more domains to enable scaled program execution, such as quantum program execution. Other non-quantum embodiments can also benefit from these techniques, such as modelling a system with multiple, mostly independently executing nodes, the outputs of which are to be aligned at a scale tighter than the instruction level (e.g., multiple cell phones sending and receiving analog waveforms, each running instructions of an application with coordinated behavior at different points in the application). In yet another example, one or more embodiments described herein can control execution of one or more execution instructions for performing one or more operations by a real-world classical and/or quantum device on one or more real-world qubits.

Furthermore, execution management system 202 and/or non-limiting system 200 can facilitate one or more technical improvements of a computer and/or computer system operating and/or comprising the execution management system 202. For example, execution management system 202 and/or non-limiting system 200 can provide control of time management, and thus of instruction execution, at a higher granularity than is managed locally at the one or more nodes. In this way, the performance at the one or more acting nodes can be improved including faster performance and/or performance comprising less complexity. Less complex performance can be facilitated at least by control by the time management component 212 facilitating triggering of one or more nodes as compared to current approaches utilizing complex higher granularity scheduling and/or provision of one or more triggers included in one or more instructions provided to the one or more nodes.

By way of further example, the one or more systems, methods and/or computer program products described herein can advance a quantum program by executing one or more streams of one or more instructions on one or more different nodes, which can be operated as separate threads, while also providing accurate modelling of TOD and/or timers for enabling accurate execution and/or alignment of quantum tasks. Compiling one or more execution aspects via the scheduling component 210 can enable the time management component 212 to simulate one or more time cycles, time delays and/or the like, which can enable a respective quantum program to be executed relative to precise clock cycle management and with high speed and/or efficiency, such as without invoking all nodes at each clock cycle. As one or more effects and/or technical improvements provided as a result of such simulation, one or more nodes can enter a wait state, such as in a sleep mode employing less computing power, a counter at a node can shut down during a wait state of the node, and/or synchronization can be lost at one or more nodes relative to one or more other nodes and/or relative to the time management component 212.

Execution management system 202 and/or non-limiting system 200 can provide additional and/or alternative technical improvements to one or more systems employing the execution management system 202. One such technical improvement can include faster and/or more efficient execution of a quantum program while employing less memory, time and/or computing power than existing management and/or control approaches at a hardware and/or software level. These technical improvements can be achieved in part due to the employment of global control and time management, facilitated by the time management component 212, execution management system 202 and/or non-limiting system 200.

Additionally and/or alternatively, another such technical improvement can be the employment and or utilization of the reduced memory, time and/or computing power than existing node management approaches relative to execution of a quantum program. Indeed, an advantage of the one or more process to be performed by the execution management system 202 can be an enhanced (e.g., improved and/or optimized) execution of a quantum program.

Accordingly, the described subject matter, by employing the time management component 212, scheduling component 210, execution component 216 and/or execution management system 202, can create an improvement in speed of execution of one or more quantum jobs due to the use of less memory, less time and/or less computing power. For example, relative to a hybrid classical/quantum non-limiting system 200, where there can be a high demand for execution of a large quantity of quantum programs employing the quantum system 201, it can follow that use of the non-limiting system 200 (e.g., including the time management component 212, scheduling component 210, execution component 216 and/or execution management system 202) can facilitate scaled execution of quantum programs. Indeed, use of the execution management system 202 itself can be scalable, such as where the execution management system 202 can perform at least one quantum program management and/or node management at least partially in parallel at a same time with another quantum program management and/or node management.

While the one or more advantages described above have been described with reference to FIGS. 2-8 and the non-limiting system 200, it will be appreciated that one or more of the advantages described above also can be applicable to the non-limiting system 100 as described relative to FIG. 1.

Description now turns to that applicable to one or more embodiments as described above with respect to FIGS. 1-8, with respect to one or more of non-limiting systems 100 and/or 200, and/or with respect to extensions and/or modifications thereof. The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein can be inherently and/or inextricably tied to computer technology and cannot be implemented outside of a hybrid classical/quantum computing environment. For example, one or more processes performed by one or more embodiments described herein can more efficiently, and even more feasibly, provide quantum program execution as compared to current systems and/or techniques. Systems, computer-implemented methods and/or computer program products facilitating performance of these processes are of great utility in the field of quantum computation and cannot be equally practicably implemented in a sensible way outside of a computing environment.

It also is to be appreciated that one or more embodiments described herein can employ hardware and/or software to solve problems that are highly technical in nature (e.g., related to digital to analog conversion and/or binary searching of a plurality of data), that are not abstract, and that cannot be performed as a set of mental acts by a human. For example, a human, or even thousands of humans, cannot efficiently, accurately and/or effectively compute digital to analog conversions and/or binary searching of a plurality of data in the time that one or more embodiments described herein can facilitate this process. And, neither the human mind nor a human with pen and paper electronically compute digital to analog conversions and/or binary searching of a plurality of data as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 11:
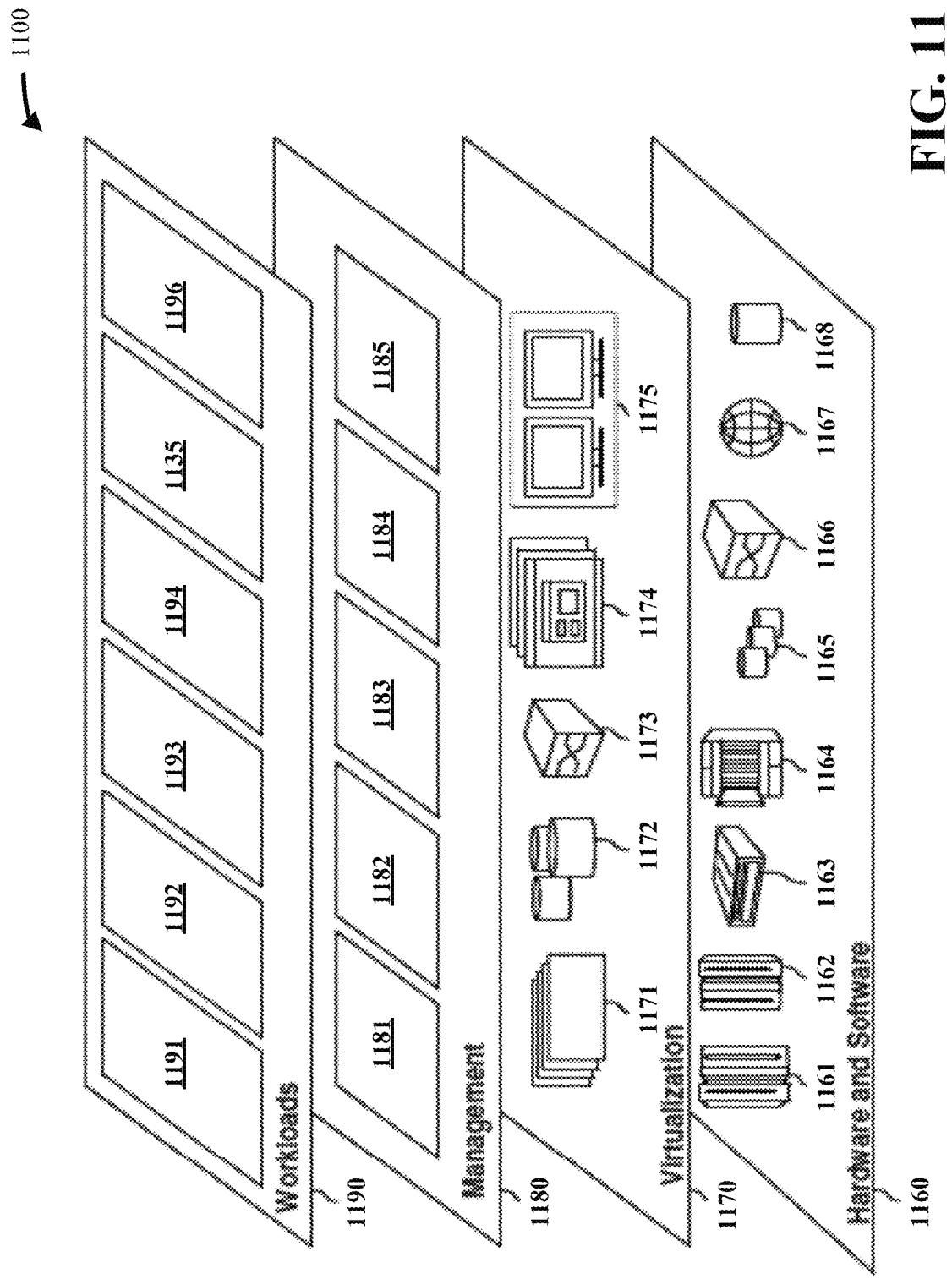
FIG. 11 illustrates a block diagram of a plurality of example, non-limiting abstraction model layers, in accordance with one or more embodiments described herein.

Turning next to FIGS. 9-11, to provide additional context for one or more embodiments described herein at FIGS. 1-8, FIGS. 9-11 are described in detail.

FIG. 9 and the following discussion are intended to provide a brief, general description of a suitable operating environment 900 in which one or more embodiments described herein at FIGS. 1-8 can be implemented. For example, one or more components and/or other aspects of embodiments described herein can be implemented in or be associated with, such as accessible via, the operating environment 900. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, handheld computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 9, the example operating environment 900 for implementing one or more embodiments of the aspects described herein can include a computer 902, the computer 902 including a processing unit 906, a system memory 904 and/or a system bus 908. It will be appreciated that one or more aspects of the system memory 904 or processing unit 906 can be applied to memories 104 and/or 204 and/or to processors 106 and/or 206, respectively of the non-limiting systems 100 and/or 200. It also will be appreciated that the system memory 904 can be implemented in combination with and/or alternatively to memories 104 and/or 204. Likewise, it also will be appreciated that the processing unit 906 can be implemented in combination with and/or alternatively to processors 106 and/or 206.

Memory 904 can store one or more computer and/or machine readable, writable and/or executable components and/or instructions that, when executed by processing unit 906 (e.g., a classical processor, a quantum processor and/or like processor), can facilitate performance of operations defined by the executable component(s) and/or instruction(s). For example, memory 904 can store computer and/or machine readable, writable and/or executable components and/or instructions that, when executed by processing unit 906, can facilitate execution of the one or more functions described herein relating to non-limiting systems 100 and/or 200 and/or execution management systems 102 and/or 202, as described herein with or without reference to the one or more figures of the one or more embodiments.

Memory 904 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 906 can comprise one or more types of processors and/or electronic circuitry (e.g., a classical processor, a quantum processor and/or like processor) that can implement one or more computer and/or machine readable, writable and/or executable components and/or instructions that can be stored at memory 904. For example, processing unit 906 can perform one or more operations that can be specified by computer and/or machine readable, writable and/or executable components and/or instructions including, but not limited to, logic, control, input/output (I/O), arithmetic and/or the like. In one or more embodiments, processing unit 906 can be any of one or more commercially available processors. In one or more embodiments, processing unit 906 can comprise one or more central processing unit, multi-core processor, microprocessor, dual microprocessors, microcontroller, System on a Chip (SOC), array processor, vector processor, quantum processor and/or another type of processor. The examples of processing unit 906 can be employed to implement one or more embodiments described herein.

The system bus 908 can couple system components including, but not limited to, the system memory 904 to the processing unit 906. The system bus 908 can comprise one or more types of bus structure that can further interconnect to a memory bus (with or without a memory controller), a peripheral bus and/or a local bus using one or more of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can include a high-speed RAM, such as static RAM for caching data.

The computer 902 can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Additionally and/or alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) can be used in addition to, or in place of, an HDD 914. The HDD 914, external storage device(s) 916 and drive 920 can be connected to the system bus 908 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules and/or data can also be cached in the RAM 912. The systems and/or methods described herein can be implemented utilizing one or more commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that can allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

An entity can enter and/or transmit commands and/or information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 906 through an input device interface 944 that can be coupled to the system bus 908, but can be connected by other interfaces, such as a parallel port, an IEEE 1394 serial port, a game port, a USB port, an IR interface, a BLUETOOTH® interface and/or the like.

A monitor 946 or other type of display device can be alternatively and/or additionally connected to the system bus 908 via an interface, such as a video adapter 948. In addition to the monitor 946, a computer typically includes other peripheral output devices (not shown), such as speakers, printers and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. Additionally and/or alternatively, the computer 902 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 954 and/or larger networks, e.g., a wide area network (WAN) 956. LAN and WAN networking environments can be commonplace in offices and companies and can facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired and/or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal and/or external and a wired and/or wireless device, can be connected to the system bus 908 via the input device interface 944. In a networked environment, program modules depicted relative to the computer 902 or portions thereof can be stored in the remote memory/storage device 952. It will be appreciated that the network connections shown are merely exemplary and one or more other means of establishing a communications link among the computers can be used.

When used in either a LAN or WAN networking environment, the computer 902 can access cloud storage systems or other network-based storage systems in addition to, and/or in place of, external storage devices 916 as described above, such as but not limited to, a network virtual machine providing one or more aspects of storage and/or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, such as with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be practiced in distributed computing environments (e.g., cloud computing environments), such as described below with respect to FIG. 10, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1050 described below with reference to FIG. 10, and/or with reference to the one or more functional abstraction layers (e.g., quantum software and/or the like) described below with reference to FIG. 11, to execute one or more operations in accordance with one or more embodiments described herein. For example, cloud computing environment 1050 and/or one or more of the functional abstraction layers 1160, 1170, 1180 and/or 1190 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting systems 100 and/or 200 and/or the example operating environment 900 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting systems 100 and/or 200 and/or example operating environment 900 can be employed to use hardware and/or software to solve problems that are highly technical in nature, that are not abstract and/or that cannot be performed as a set of mental acts by a human.

Referring now to details of one or more aspects illustrated at FIG. 10, the illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C and/or automobile computer system 1054N can communicate. Although not illustrated in FIG. 10, cloud computing nodes 1010 can further comprise a quantum platform (e.g., quantum computer, quantum hardware, quantum software and/or the like) with which local computing devices used by cloud consumers can communicate. Cloud computing nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that cloud computing nodes 1010 and cloud computing environment 1050 can communicate with any type of computerized device over any type of network and/or network addressable connection (e.g., using a web browser).

Referring now to details of one or more aspects illustrated at FIG. 11, a set 1100 of functional abstraction layers is shown, such as provided by cloud computing environment 1050 (FIG. 10). One or more embodiments described herein can be associated with, such as accessible via, one or more functional abstraction layers described below with reference to FIG. 11 (e.g., hardware and software layer 1160, virtualization layer 1170, management layer 1180 and/or workloads layer 1190). It should be understood in advance that the components, layers and/or functions shown in FIG. 11 are intended to be illustrative only and embodiments described herein are not limited thereto. As depicted, the following layers and/or corresponding functions are provided:

Hardware and software layer 1160 can include hardware and software components. Examples of hardware components include: mainframes 1161; RISC (Reduced Instruction Set Computer) architecture-based servers 1162; servers 1163; blade servers 1164; storage devices 1165; and/or networks and/or networking components 1166. In one or more embodiments, software components can include network application server software 1167, quantum platform routing software 1168; and/or quantum software (not illustrated in FIG. 11).

Virtualization layer 1170 can provide an abstraction layer from which the following examples of virtual entities can be provided: virtual servers 1171; virtual storage 1172; virtual networks 1173, including virtual private networks; virtual applications and/or operating systems 1174; and/or virtual clients 1175.

In one example, management layer 1180 can provide the functions described below. Resource provisioning 1181 can provide dynamic procurement of computing resources and other resources that can be utilized to perform tasks within the cloud computing environment. Metering and Pricing 1182 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1183 can provide access to the cloud computing environment for consumers and system administrators. Service level management 1184 can provide cloud computing resource allocation and/or management such that required service levels are met. Service Level Agreement (SLA) planning and fulfillment 1185 can provide pre-arrangement for, and procurement of, cloud computing resources for which a future requirement is anticipated in accordance with an SLA.

Workloads layer 1190 can provide examples of functionality for which the cloud computing environment can be utilized. Non-limiting examples of workloads and functions which can be provided from this layer include: mapping and navigation 1191; software development and lifecycle management 1192; virtual classroom education delivery 1193; data analytics processing 1194; transaction processing 1195; and/or application transformation software 1196.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components; and
a processor that executes the computer executable components stored in the memory, wherein the computer executable components comprise:
a time management component that communicates with a node to trigger the node to execute one or more quantum program instructions relative to a counter of the node that is advanced by the communicating, wherein the time management component employs one or more mailboxes at the node, wherein the one or more mailboxes dynamically alter one or more designations of the one or more mailboxes that relate to a present execution state of the node.

2. The system of claim 1, wherein the time management component triggers the node to execute the one or more quantum program instructions via a transfer of data to the node.

3. The system of claim 1, wherein the time management component advances the counter at the node based upon a combination of time of another node and of a determined actual propagation time for the communicating.

4. The system of claim 1, wherein the node self-advances the counter relative to execution of one or more quantum program instructions that are not dependent upon the communicating.

5. The system of claim 1, wherein the node locally controls instruction execution once triggered until a wait state is activated, and wherein the time management component controls switching of the wait state to an active state via triggering the node.

6. The system of claim 1, wherein the computer executable components further comprise:
a scheduling component that identifies, prior to execution of the one or more quantum program instructions, one or more instruction execution initiations or dependencies that will be encountered at the node.

7. The system of claim 6, wherein the scheduling component further schedules a wait instruction that triggers a wait state of and pauses the counter at the node upon the node encountering at least one of the one or more identified instruction execution initiations and or dependencies during execution of the one or more quantum program instructions.

8. A computer-implemented method, comprising:
communicating, by a system operatively coupled to a processor, with a node to trigger the node to execute one or more quantum program instructions relative to a counter of the node that is advanced by the communicating; and
advancing, by the system, the counter at the node based upon a combination of time of another node and of a determined actual propagation time for the communicating.

9. The computer-implemented method of claim 8, further comprising:
triggering, by the system, the node to execute the one or more quantum program instructions via a transfer of data to the node.

10. The computer-implemented method of claim 8, further comprising:
self-advancing, by the node of the system, the counter relative to execution of one or more quantum program instructions that are not dependent upon the communicating.

11. The computer-implemented method of claim 8, further comprising:
employing, by the system, one or more mailboxes at the node, wherein the one or more mailboxes dynamically alter one or more designations of the one or more mailboxes that relate to a present execution state of the node.

12. The computer-implemented method of claim 8, further comprising:
enabling, by the system, local control at the node of instruction execution once triggered until a wait state is activated, and
controlling, by the system, switching of the wait state to an active state via triggering the node.

13. The computer-implemented method of claim 8, wherein the node locally controls instruction execution once triggered until a wait state is activated, and further comprising:
controlling, by the system, switching of the wait state to an active state via triggering the node.

14. The computer-implemented method of claim 8, further comprising:
identifying, by the system, prior to execution of the one or more quantum program instructions, one or more instruction execution initiations or dependencies that will be encountered at the node.

15. A computer program product facilitating time management of a quantum program at one or more nodes of a system, the computer program product comprising a computer readable storage medium having program instructions embodied therewith, the program instructions executable by a processor of the system to cause the processor to:
communicate, by the processor, with a node to trigger the node to execute one or more quantum program instructions relative to a counter of the node that is advanced by the communicating; and
self-advance, by the node via the processor, the counter relative to execution of one or more quantum program instructions that are not dependent upon the communicating.

16. The computer program product of claim 15, wherein the program instructions are further executable to cause the processor to:
trigger, by the processor, the node to execute the one or more quantum program instructions via a transfer of data to the node.

17. The computer program product of claim 15, wherein the program instructions are further executable to cause the processor to:
advance, by the processor, the counter at the node based upon a combination of time of another node and of a determined actual propagation time for the communicating.

18. The computer program product of claim 15, wherein the program instructions are further executable to cause the processor to:
employ, by the processor, one or more mailboxes at the node, wherein the one or more mailboxes dynamically alter one or more designations of the one or more mailboxes that relate to a present execution state of the node.

19. The computer program product of claim 15, wherein the program instructions are further executable to cause the processor to:
enable, by the processor, local control at the node of instruction execution once triggered until a wait state is activated, and
control, by the processor, switching of the wait state to an active state via triggering the node.

20. The computer-implemented method of claim 14, further comprising:
scheduling, by the system, a wait instruction that triggers a wait state of and pauses the counter at the node upon the node encountering at least one of the one or more identified instruction execution initiations and or dependencies during execution of the one or more quantum program instructions.

* * * * *